US010081750B2

(12) United States Patent
Shroff Rama et al.

(10) Patent No.: US 10,081,750 B2
(45) Date of Patent: Sep. 25, 2018

(54) CLAY STABILIZATION WITH CONTROL OF MIGRATION OF CLAYS AND FINES

(71) Applicant: Halliburton Energy Services, Inc., Houston, TX (US)

(72) Inventors: Mallikarjuna Shroff Rama, Pune (IN); Sumit Ramesh Songire, Pune (IN); Lalit Pandurang Salgaonkar, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/116,726

(22) PCT Filed: Apr. 23, 2014

(86) PCT No.: PCT/US2014/035115
§ 371 (c)(1),
(2) Date: Aug. 4, 2016

(87) PCT Pub. No.: WO2015/163866
PCT Pub. Date: Oct. 29, 2015

(65) Prior Publication Data
US 2016/0347983 A1    Dec. 1, 2016

(51) Int. Cl.
*E21B 43/267*    (2006.01)
*C09K 8/80*    (2006.01)
(Continued)

(52) U.S. Cl.
CPC .............. *C09K 8/035* (2013.01); *C09K 8/42* (2013.01); *C09K 8/62* (2013.01); *C09K 8/74* (2013.01);
(Continued)

(58) Field of Classification Search
CPC .......... C09K 8/805; C09K 8/42; C09K 8/602; C09K 2208/10; C09K 8/035; C09K 8/74;
(Continued)

(56) References Cited

U.S. PATENT DOCUMENTS 4,366,073 A    12/1982    McLaughlin et al.
4,828,726 A    5/1989    Himes et al.
(Continued)

FOREIGN PATENT DOCUMENTS

CA    1092575    12/1980
CA    1097904    3/1981
(Continued)

OTHER PUBLICATIONS

"International Application Serial No. PCT/US2014/035115, International Search Report dated Mar. 27, 2015", 3 pgs.
(Continued)

*Primary Examiner* — Zakiya W Bates
(74) *Attorney, Agent, or Firm* — Chamberlain Hrdlicka

(57) ABSTRACT

Various embodiments disclosed related to methods of treating subterranean formations as well as compositions and systems for performing the same. In various embodiments, the present invention provides a method of treating a subterranean formation that includes obtaining or providing a composition including a compound including at least one silylating group and at least one ammonium group. The method also includes placing the composition in a subterranean formation.

20 Claims, 2 Drawing Sheets

(51) Int. Cl.
    C09K 8/035      (2006.01)
    E21B 21/01      (2006.01)
    C09K 8/42       (2006.01)
    C09K 8/62       (2006.01)
    C09K 8/74       (2006.01)
    E21B 33/138     (2006.01)
    E21B 43/26      (2006.01)

(52) U.S. Cl.
    CPC .......... *E21B 21/01* (2013.01); *E21B 33/138* (2013.01); *E21B 43/26* (2013.01); *C09K 2208/12* (2013.01)

(58) Field of Classification Search
    CPC ......... C09K 8/62; C09K 8/584; E21B 43/267; E21B 43/26; E21B 43/16
    See application file for complete search history.

(56) References Cited

U.S. PATENT DOCUMENTS

| | | | |
|---|---|---|---|
| 5,197,544 | A | 3/1993 | Himes |
| 5,342,530 | A | 8/1994 | Aften et al. |
| 5,771,971 | A | 6/1998 | Horton et al. |
| 5,908,814 | A | 6/1999 | Patel et al. |
| 6,439,309 | B1 | 8/2002 | Matherly et al. |
| 7,740,071 | B2 | 6/2010 | Smith et al. |
| 2004/0035677 | A1 | 2/2004 | Konieczny |
| 2007/0029087 | A1 | 2/2007 | Nguyen et al. |
| 2010/0120944 | A1 | 5/2010 | Ballard |
| 2010/0210484 | A1 | 8/2010 | Smith et al. |

FOREIGN PATENT DOCUMENTS

| | | |
|---|---|---|
| CA | 1103008 | 6/1981 |
| CA | 1227744 | 10/1987 |
| CA | 2106778 | 3/1997 |
| CA | 2300110 | 2/1999 |
| CA | 2492797 | 6/2011 |
| WO | 9312053 | 6/1993 |
| WO | WO-2010076744 A1 | 7/2010 |
| WO | WO-2015163866 A1 | 10/2015 |

OTHER PUBLICATIONS

"International Application Serial No. PCT/US2014/035115, Written Opinion dated Mar. 27, 2015", 15 pgs.

Gomez, S., et al., "Shale Inhibition: What Works?", SPE 164108, SPE International Symposium on Oilfield Chemistry, Apr. 8-10, The Woodlands, Texas, USA, (2013), 1-11.

Maley, D., et al., "Non-Polymeric Permanent Clay Stabilizer for Shale Completions", SPE 165168, SPE Europena Formation Damage Conference & Exhibition, Jun. 5-7, Noordwijk, The Netherlands, (2013), 1-18.

Anonymous, "(3-Aminopropyl)triethoxysilane," Wikipedia, Jul. 2012, retrieved Jun. 1, 2017: pp. 1-3, <https://en.wikipedia.org/w/index.php?title=(3-Aminopropyl)triethoxysilane&oldid=501405354>.

CLAY STABILIZATION WITH CONTROL OF MIGRATION OF CLAYS AND FINES

PRIORITY APPLICATIONS

This application is a U.S. National Stage Filing under 35 U.S.C. 371 from International Application No. PCT/US2014/035115, filed on 23 Apr. 2014, and published as WO 2015/163866 on 29 Oct. 2015, which application and publication is incorporated herein by reference in its entirety.

BACKGROUND OF THE INVENTION

Swelling clays can be a major mechanism of formation damage due to loss of mobility of hydrocarbon fluids in the formation. Migrating clays and other fines also cause permeability damage. When clays and other fines are disturbed, they may begin to migrate within the production stream and, too frequently, encounter constrictions in the capillary, where they bridge off the capillary and severely diminish the flow rate of hydrocarbons to the wellbore. The change in the nature of the water present may cause the fines to disperse or come loose from adhesion to capillary walls, usually resulting in the migration of the fines through the formation, where plugging can occur in smaller pore throats. Sometimes the loss of permeability observed is due to clay swelling with the relatively fresh water, with or without migration, but often clay swelling is accompanied by migration of fines. Non-swelling clays may also respond to the foreign water and begin to migrate.

BRIEF DESCRIPTION OF THE FIGURES

The drawings illustrate generally, by way of example, but not by way of limitation, various embodiments discussed in the present document.

DETAILED DESCRIPTION OF THE INVENTION

Figure 1:
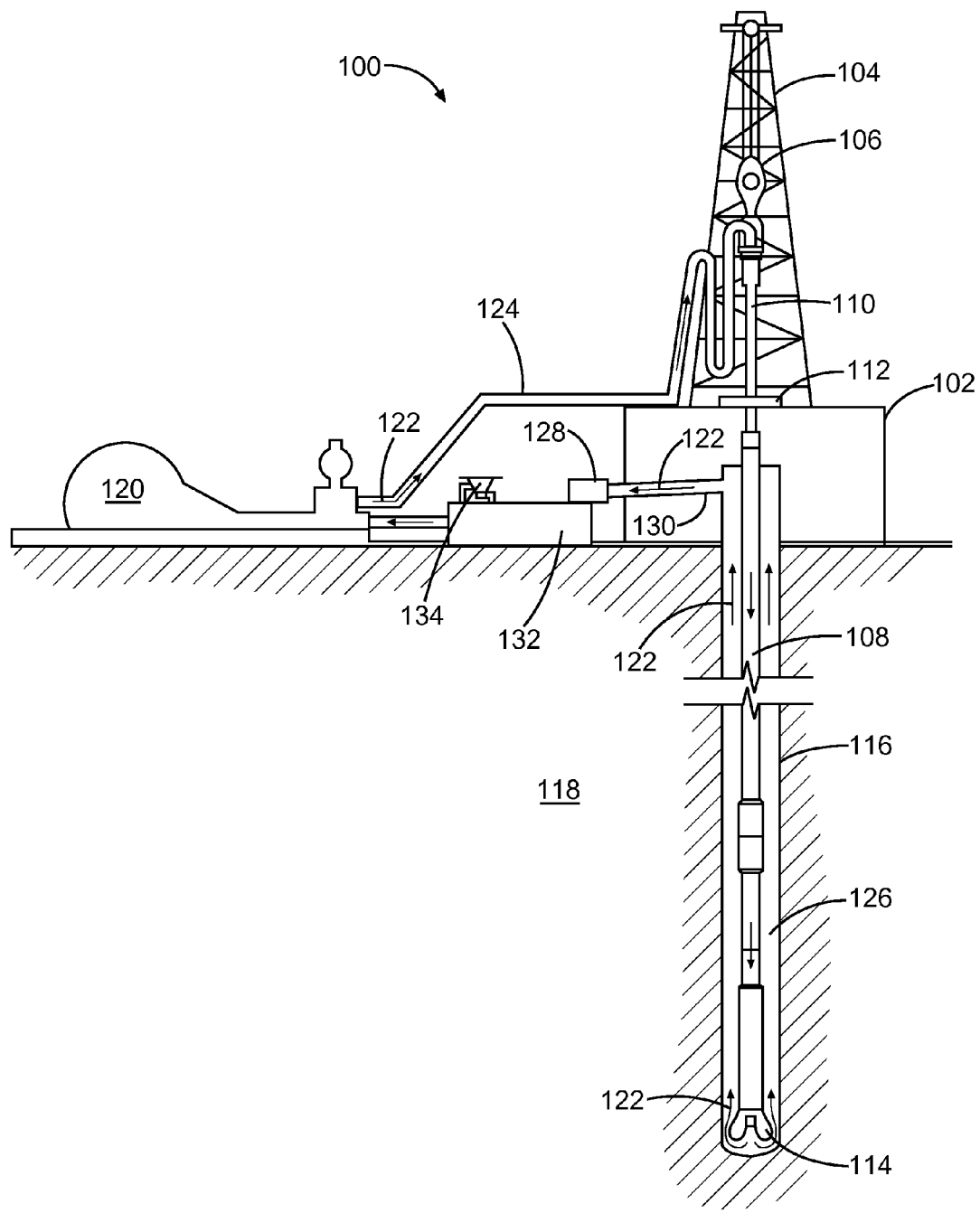
FIG. 1 illustrates a drilling assembly, in accordance with various embodiments.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods of manufacturing described herein, the steps can be carried out in any order without departing from the principles of the invention, except when a temporal or operational sequence is explicitly recited. Furthermore, specified steps can be carried out concurrently unless explicit claim language recites that they be carried out separately. For example, a claimed step of doing X and a claimed step of doing Y can be conducted simultaneously within a single operation, and the resulting process will fall within the literal scope of the claimed process.

Selected substituents within the compounds described herein are present to a recursive degree. In this context, "recursive substituent" means that a substituent may recite another instance of itself or of another substituent that itself recites the first substituent. Recursive substituents are an intended aspect of the disclosed subject matter. Because of the recursive nature of such substituents, theoretically, a large number may be present in any given claim. One of ordinary skill in the art of organic chemistry understands that the total number of such substituents is reasonably limited by the desired properties of the compound intended. Such properties include, by way of example and not limitation, physical properties such as molecular weight, solubility, and practical properties such as ease of synthesis. Recursive substituents can call back on themselves any suitable number of times, such as about 1 time, about 2 times, 3, 4, 5, 6, 7, 8, 9, 10, 15, 20, 30, 50, 100, 200, 300, 400, 500, 750, 1000, 1500, 2000, 3000, 4000, 5000, 10,000, 15,000, 20,000, 30,000, 50,000, 100,000, 200,000, 500,000, 750,000, or about 1,000,000 times or more.

The term "about" as used herein can allow for a degree of variability in a value or range, for example, within 10%, within 5%, or within 1% of a stated value or of a stated limit of a range.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more.

The term "organic group" as used herein refers to but is not limited to any carbon-containing functional group. For example, an oxygen-containing group such as an alkoxy group, aryloxy group, aralkyloxy group, oxo(carbonyl) group, a carboxyl group including a carboxylic acid, carboxylate, and a carboxylate ester; a sulfur-containing group such as an alkyl and aryl sulfide group; and other heteroatom-containing groups. Non-limiting examples of organic groups include OR, OOR, OC(O)N(R)$_2$, CN, CF$_3$, OCF$_3$, R, C(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen (in examples that include other carbon atoms) or a carbon-based moiety, and wherein the carbon-based moiety can itself be further substituted.

The term "substituted" as used herein refers to an organic group as defined herein or molecule in which one or more hydrogen atoms contained therein are replaced by one or more non-hydrogen atoms. The term "functional group" or "substituent" as used herein refers to a group that can be or is substituted onto a molecule or onto an organic group. Examples of substituents or functional groups include, but are not limited to, a halogen (e.g., F, Cl, Br, and I); an oxygen atom in groups such as hydroxy groups, alkoxy groups, aryloxy groups, aralkyloxy groups, oxo(carbonyl) groups, carboxyl groups including carboxylic acids, carboxylates, and carboxylate esters; a sulfur atom in groups such as thiol groups, alkyl and aryl sulfide groups, sulfoxide groups, sulfone groups, sulfonyl groups, and sulfonamide groups; a nitrogen atom in groups such as amines, hydroxyamines, nitriles, nitro groups, N-oxides, hydrazides, azides, and enamines; and other heteroatoms in various other groups. Non-limiting examples of substituents J that can be bonded to a substituted carbon (or other) atom include F, Cl, Br, I, OR, OC(O)N(R)$_2$, CN, NO, NO$_2$, ONO$_2$, azido, CF$_3$, OCF$_3$, R, O (oxo), S (thiono), C(O), S(O), methylenedioxy, ethylenedioxy, N(R)$_2$, SR, SOR, SO$_2$R, SO$_2$N(R)$_2$, SO$_3$R, C(O)R, C(O)C(O)R, C(O)CH$_2$C(O)R, C(S)R, C(O)OR, OC(O)R, C(O)N(R)$_2$, OC(O)N(R)$_2$, C(S)N(R)$_2$, (CH$_2$)$_{0-2}$N(R)C(O)R, (CH$_2$)$_{0-2}$N(R)N(R)$_2$, N(R)N(R)C(O)R, N(R)N(R)C(O)OR, N(R)N(R)CON(R)$_2$, N(R)SO$_2$R, N(R)SO$_2$N(R)$_2$, N(R)C(O)OR, N(R)C(O)R, N(R)C(S)R, N(R)C(O)N(R)$_2$, N(R)C(S)N(R)$_2$, N(COR)COR, N(OR)R, C(=NH)N(R)$_2$, C(O)N(OR)R, or C(=NOR)R, wherein R can be hydrogen or a carbon-based moiety, and wherein the carbon-based moiety can itself be further substituted; for example, wherein R can be hydrogen, alkyl, acyl, cycloalkyl, aryl, aralkyl, heterocyclyl, heteroaryl, or heteroarylalkyl, wherein any alkyl, acyl, cycloalkyl, aryl, aralkyl, heterocyclyl, heteroaryl, or heteroarylalkyl or R can be independently mono- or multi-substituted with J; or wherein two R groups bonded to a nitrogen atom or to adjacent nitrogen atoms can together with the nitrogen atom or atoms form a heterocyclyl, which can be mono- or independently multi-substituted with J.

The term "alkyl" as used herein refers to straight chain and branched alkyl groups and cycloalkyl groups having from 1 to 40 carbon atoms, 1 to about 20 carbon atoms, 1 to 12 carbons or, in some embodiments, from 1 to 8 carbon atoms. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, t-butyl, neopentyl, isopentyl, and 2,2-dimethylpropyl groups. As used herein, the term "alkyl" encompasses n-alkyl, isoalkyl, and anteisoalkyl groups as well as other branched chain forms of alkyl. Representative substituted alkyl groups can be substituted one or more times with any of the groups listed herein, for example, amino, hydroxy, cyano, carboxy, nitro, thio, alkoxy, and halogen groups.

The term "alkenyl" as used herein refers to straight and branched chain and cyclic alkyl groups as defined herein, except that at least one double bond exists between two carbon atoms. Thus, alkenyl groups have from 2 to 40 carbon atoms, or 2 to about 20 carbon atoms, or 2 to 12 carbons or, in some embodiments, from 2 to 8 carbon atoms. Examples include, but are not limited to vinyl, —CH=CH(CH$_3$), —CH=C(CH$_3$)$_2$, —C(CH$_3$)=CH$_2$, —C(CH$_3$)=CH(CH$_3$), —C(CH$_2$CH$_3$)=CH$_2$, cyclohexenyl, cyclopentenyl, cyclohexadienyl, butadienyl, pentadienyl, and hexadienyl among others.

The term "alkynyl" as used herein refers to straight and branched chain alkyl groups, except that at least one triple bond exists between two carbon atoms. Thus, alkynyl groups have from 2 to 40 carbon atoms, 2 to about 20 carbon atoms, or from 2 to 12 carbons or, in some embodiments, from 2 to 8 carbon atoms. Examples include, but are not limited to —C≡CH, —C≡C(CH$_3$), —C≡C(CH$_2$CH$_3$), —CH$_2$C≡CH, —CH$_2$C≡C(CH$_3$), and —CH$_2$C≡C(CH$_2$CH$_3$) among others.

The term "acyl" as used herein refers to a group containing a carbonyl moiety wherein the group is bonded via the carbonyl carbon atom. The carbonyl carbon atom is also bonded to another carbon atom, which can be part of an alkyl, aryl, aralkyl cycloalkyl, cycloalkylalkyl, heterocyclyl, heterocyclylalkyl, heteroaryl, heteroarylalkyl group or the like. In the special case wherein the carbonyl carbon atom is bonded to a hydrogen, the group is a "formyl" group, an acyl group as the term is defined herein. An acyl group can include 0 to about 12-20 or 12-40 additional carbon atoms bonded to the carbonyl group. An acyl group can include double or triple bonds within the meaning herein. An acryloyl group is an example of an acyl group. An acyl group can also include heteroatoms within the meaning here. A nicotinoyl group (pyridyl-3-carbonyl) is an example of an acyl group within the meaning herein. Other examples include acetyl, benzoyl, phenylacetyl, pyridylacetyl, cinnamoyl, and acryloyl groups and the like. When the group containing the carbon atom that is bonded to the carbonyl carbon atom contains a halogen, the group is termed a "haloacyl" group. An example is a trifluoroacetyl group.

The term "cycloalkyl" as used herein refers to cyclic alkyl groups such as, but not limited to, cyclopropyl, cyclobutyl, cyclopentyl, cyclohexyl, cycloheptyl, and cyclooctyl groups. In some embodiments, the cycloalkyl group can have 3 to about 8-12 ring members, whereas in other embodiments the number of ring carbon atoms range from 3 to 4, 5, 6, or 7. Cycloalkyl groups further include polycyclic cycloalkyl groups such as, but not limited to, norbornyl, adamantyl, bornyl, camphenyl, isocamphenyl, and carenyl groups, and fused rings such as, but not limited to, decalinyl, and the like. Cycloalkyl groups also include rings that are substituted with straight or branched chain alkyl groups as defined herein. Representative substituted cycloalkyl groups can be mono-substituted or substituted more than once, such as, but not limited to, 2,2-, 2,3-, 2,4- 2,5- or 2,6-disubstituted cyclohexyl groups or mono-, di- or tri-substituted norbornyl or cycloheptyl groups, which can be substituted with, for example, amino, hydroxy, cyano, carboxy, nitro, thio, alkoxy, and halogen groups. The term "cycloalkenyl" alone or in combination denotes a cyclic alkenyl group.

The term "aryl" as used herein refers to cyclic aromatic hydrocarbons that do not contain heteroatoms in the ring. Thus aryl groups include, but are not limited to, phenyl, azulenyl, heptalenyl, biphenyl, indacenyl, fluorenyl, phenanthrenyl, triphenylenyl, pyrenyl, naphthacenyl, chrysenyl, biphenylenyl, anthracenyl, and naphthyl groups. In some embodiments, aryl groups contain about 6 to about 14 carbons in the ring portions of the groups. Aryl groups can be unsubstituted or substituted, as defined herein. Representative substituted aryl groups can be mono-substituted or substituted more than once, such as, but not limited to, 2-, 3-, 4-, 5-, or 6-substituted phenyl or 2-8 substituted naphthyl groups, which can be substituted with carbon or non-carbon groups such as those listed herein.

The term "aralkyl" as used herein refers to alkyl groups as defined herein in which a hydrogen or carbon bond of an alkyl group is replaced with a bond to an aryl group as defined herein. Representative aralkyl groups include benzyl and phenylethyl groups and fused (cycloalkylaryl)alkyl groups such as 4-ethyl-indanyl. Aralkenyl groups are alkenyl groups as defined herein in which a hydrogen or carbon bond of an alkyl group is replaced with a bond to an aryl group as defined herein.

The term "heterocyclyl" as used herein refers to aromatic and non-aromatic ring compounds containing 3 or more ring members, of which one or more is a heteroatom such as, but not limited to, N, O, and S. Thus, a heterocyclyl can be a cycloheteroalkyl, or a heteroaryl, or if polycyclic, any combination thereof. In some embodiments, heterocyclyl groups include 3 to about 20 ring members, whereas other such groups have 3 to about 15 ring members. A heterocyclyl group designated as a $C_2$-heterocyclyl can be a 5-ring with two carbon atoms and three heteroatoms, a 6-ring with two carbon atoms and four heteroatoms and so forth. Likewise a $C_4$-heterocyclyl can be a 5-ring with one heteroatom, a 6-ring with two heteroatoms, and so forth. The number of carbon atoms plus the number of heteroatoms equals the total number of ring atoms. A heterocyclyl ring can also include one or more double bonds. A heteroaryl ring is an embodiment of a heterocyclyl group. The phrase "heterocyclyl group" includes fused ring species including those that include fused aromatic and non-aromatic groups.

The term "alkoxy" as used herein refers to an oxygen atom connected to an alkyl group, including a cycloalkyl group, as are defined herein. Examples of linear alkoxy groups include but are not limited to methoxy, ethoxy, propoxy, butoxy, pentyloxy, hexyloxy, and the like. Examples of branched alkoxy include but are not limited to isopropoxy, sec-butoxy, tert-butoxy, isopentyloxy, isohexyloxy, and the like. Examples of cyclic alkoxy include but are not limited to cyclopropyloxy, cyclobutyloxy, cyclopentyloxy, cyclohexyloxy, and the like. An alkoxy group can include one to about 12-20 or about 12-40 carbon atoms bonded to the oxygen atom, and can further include double or triple bonds, and can also include heteroatoms. For example, an allyloxy group is an alkoxy group within the meaning herein. A methoxyethoxy group is also an alkoxy group within the meaning herein, as is a methylenedioxy group in a context where two adjacent atoms of a structure are substituted therewith.

The term "amine" as used herein refers to primary, secondary, and tertiary amines having, e.g., the formula N(group)$_3$ wherein each group can independently be H or non-H, such as alkyl, aryl, and the like Amines include but are not limited to R—NH$_2$, for example, alkylamines, arylamines, alkylarylamines; R$_2$NH wherein each R is independently selected, such as dialkylamines, diarylamines, aralkylamines, heterocyclylamines and the like; and R$_3$N wherein each R is independently selected, such as trialkylamines, dialkylarylamines, alkyldiarylamines, triarylamines, and the like. The term "amine" also includes ammonium ions as used herein.

The term "amino group" as used herein refers to a substituent of the form —NH$_2$, —NHR, —NR$_2$, —NR$_3^+$, wherein each R is independently selected, and protonated forms of each, except for —NR$_3^+$, which cannot be protonated. Accordingly, any compound substituted with an amino group can be viewed as an amine An "amino group" within the meaning herein can be a primary, secondary, tertiary, or quaternary amino group. An "alkylamino" group includes a monoalkylamino, dialkylamino, and trialkylamino group.

The terms "halo," "halogen," or "halide" group, as used herein, by themselves or as part of another substituent, mean, unless otherwise stated, a fluorine, chlorine, bromine, or iodine atom.

The term "haloalkyl" group, as used herein, includes mono-halo alkyl groups, poly-halo alkyl groups wherein all halo atoms can be the same or different, and per-halo alkyl groups, wherein all hydrogen atoms are replaced by halogen atoms, such as fluoro. Examples of haloalkyl include trifluoromethyl, 1,1-dichloroethyl, 1,2-dichloroethyl, 1,3-dibromo-3,3-difluoropropyl, perfluorobutyl, and the like.

The term "hydrocarbon" as used herein refers to a functional group or molecule that includes carbon and hydrogen atoms. The term can also refer to a functional group or molecule that normally includes both carbon and hydrogen atoms but wherein all the hydrogen atoms are substituted with other functional groups.

As used herein, the term "hydrocarbyl" refers to a functional group derived from a straight chain, branched, or cyclic hydrocarbon, and can be alkyl, alkenyl, alkynyl, aryl, cycloalkyl, acyl, or any combination thereof.

The term "solvent" as used herein refers to a liquid that can dissolve a solid, liquid, or gas. Nonlimiting examples of solvents are silicones, organic compounds, water, alcohols, ionic liquids, and supercritical fluids.

The term "number-average molecular weight" as used herein refers to the ordinary arithmetic mean of the molecular weight of individual molecules in a sample. It is defined as the total weight of all molecules in a sample divided by the total number of molecules in the sample. Experimentally, the number-average molecular weight ($M_n$) is determined by analyzing a sample divided into molecular weight fractions of species i having $n_i$ molecules of molecular weight $M_i$ through the formula $M_n = \Sigma M_i n_i / \Sigma n_i$. The number-average molecular weight can be measured by a variety of well-known methods including gel permeation chromatography, spectroscopic end group analysis, and osmometry. If unspecified, molecular weights of polymers given herein are number-average molecular weights.

The term "weight-average molecular weight" as used herein refers to $M_w$, which is equal to $\Sigma M_i^2 n_i / \Sigma M_i n_i$, where $n_i$ is the number of molecules of molecular weight $M_i$. In various examples, the weight-average molecular weight can be determined using light scattering, small angle neutron scattering, X-ray scattering, and sedimentation velocity.

The term "room temperature" as used herein refers to a temperature of about 15° C. to 28° C.

The term "standard temperature and pressure" as used herein refers to 20° C. and 101 kPa.

As used herein, "degree of polymerization" is the number of repeating units in a polymer.

As used herein, the term "polymer" refers to a molecule having at least one repeating unit and can include copolymers.

The term "copolymer" as used herein refers to a polymer that includes at least two different monomers. A copolymer can include any suitable number of monomers.

The term "downhole" as used herein refers to under the surface of the earth, such as a location within or fluidly connected to a wellbore.

As used herein, the term "drilling fluid" refers to fluids, slurries, or muds used in drilling operations downhole, such as during the formation of the wellbore.

As used herein, the term "stimulation fluid" refers to fluids or slurries used downhole during stimulation activities of the well that can increase the production of a well, including perforation activities. In some examples, a stimulation fluid can include a fracturing fluid or an acidizing fluid.

As used herein, the term "clean-up fluid" refers to fluids or slurries used downhole during clean-up activities of the well, such as any treatment to remove material obstructing the flow of desired material from the subterranean formation. In one example, a clean-up fluid can be an acidification treatment to remove material formed by one or more perforation treatments. In another example, a clean-up fluid can be used to remove a filter cake.

As used herein, the term "fracturing fluid" refers to fluids or slurries used downhole during fracturing operations.

As used herein, the term "spotting fluid" refers to fluids or slurries used downhole during spotting operations, and can be any fluid designed for localized treatment of a downhole region. In one example, a spotting fluid can include a lost circulation material for treatment of a specific section of the wellbore, such as to seal off fractures in the wellbore and prevent sag. In another example, a spotting fluid can include a water control material. In some examples, a spotting fluid can be designed to free a stuck piece of drilling or extraction equipment, can reduce torque and drag with drilling lubricants, prevent differential sticking, promote wellbore stability, and can help to control mud weight.

As used herein, the term "completion fluid" refers to fluids or slurries used downhole during the completion phase of a well, including cementing compositions.

As used herein, the term "remedial treatment fluid" refers to fluids or slurries used downhole for remedial treatment of a well. Remedial treatments can include treatments designed to increase or maintain the production rate of a well, such as stimulation or clean-up treatments.

As used herein, the term "abandonment fluid" refers to fluids or slurries used downhole during or preceding the abandonment phase of a well.

As used herein, the term "acidizing fluid" refers to fluids or slurries used downhole during acidizing treatments. In one example, an acidizing fluid is used in a clean-up operation to remove material obstructing the flow of desired material, such as material formed during a perforation operation. In some examples, an acidizing fluid can be used for damage removal.

As used herein, the term "cementing fluid" refers to fluids or slurries used during cementing operations of a well. For example, a cementing fluid can include an aqueous mixture including at least one of cement and cement kiln dust. In another example, a cementing fluid can include a curable resinous material such as a polymer that is in an at least partially uncured state.

As used herein, the term "water control material" refers to a solid or liquid material that interacts with aqueous material downhole, such that hydrophobic material can more easily travel to the surface and such that hydrophilic material (including water) can less easily travel to the surface. A water control material can be used to treat a well to cause the proportion of water produced to decrease and to cause the proportion of hydrocarbons produced to increase, such as by selectively binding together material between water-producing subterranean formations and the wellbore while still allowing hydrocarbon-producing formations to maintain output.

As used herein, the term "packing fluid" refers to fluids or slurries that can be placed in the annular region of a well between tubing and outer casing above a packer. In various examples, the packing fluid can provide hydrostatic pressure in order to lower differential pressure across the sealing element, lower differential pressure on the wellbore and casing to prevent collapse, and protect metals and elastomers from corrosion.

As used herein, the term "fluid" refers to liquids and gels, unless otherwise indicated.

As used herein, the term "subterranean material" or "subterranean formation" refers to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

As used herein, "treatment of a subterranean formation" can include any activity directed to extraction of water or petroleum materials from a subterranean petroleum- or water-producing formation or region, for example, including drilling, stimulation, hydraulic fracturing, clean-up, acidizing, completion, cementing, remedial treatment, abandonment, and the like.

As used herein, a "flow pathway" downhole can include any suitable subterranean flow pathway through which two subterranean locations are in fluid connection. The flow pathway can be sufficient for petroleum or water to flow from one subterranean location to the wellbore or vice-versa. A flow pathway can include at least one of a hydraulic fracture, a fluid connection across a screen, across gravel pack, across proppant, including across resin-bonded proppant or proppant deposited in a fracture, and across sand. A flow pathway can include a natural subterranean passageway through which fluids can flow. In some embodiments, a flow pathway can be a water source and can include water. In some embodiments, a flow pathway can be a petroleum source and can include petroleum. In some embodiments, a flow pathway can be sufficient to divert from a wellbore, fracture, or flow pathway connected thereto at least one of water, a downhole fluid, or a produced hydrocarbon.

As used herein, a "carrier fluid" refers to any suitable fluid for suspending, dissolving, mixing, or emulsifying with one or more materials to form a composition. For example, the carrier fluid can be at least one of crude oil, dipropylene glycol methyl ether, dipropylene glycol dimethyl ether, dipropylene glycol methyl ether, dipropylene glycol dimethyl ether, dimethyl formamide, diethylene glycol methyl ether, ethylene glycol butyl ether, diethylene glycol butyl ether, butylglycidyl ether, propylene carbonate, D-limonene, a $C_2$-$C_{40}$ fatty acid $C_1$-$C_{10}$ alkyl ester (e.g., a fatty acid methyl ester), tetrahydrofurfuryl methacrylate, tetrahydrofurfuryl acrylate, 2-butoxy ethanol, butyl acetate, butyl lactate, furfuryl acetate, dimethyl sulfoxide, dimethyl formamide, a petroleum distillation product of fraction (e.g., diesel, kerosene, napthas, and the like) mineral oil, a hydrocarbon oil, a hydrocarbon including an aromatic carbon-carbon bond (e.g., benzene, toluene), a hydrocarbon including an alpha olefin, xylenes, an ionic liquid, methyl ethyl ketone, an ester of oxalic, maleic or succinic acid, methanol, ethanol, propanol (iso- or normal-), butyl alcohol (iso-, tert-, or normal-), an aliphatic hydrocarbon (e.g., cyclohexanone, hexane), water, brine, produced water, flowback water, brackish water, and sea water. The fluid can form about 0.001 wt % to about 99.999 wt % of a composition or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

In various embodiments, the present invention provides a method of treating a subterranean formation. The method includes obtaining or providing a composition including a compound including at least one silylating group and at least one ammonium group. The method also includes placing the composition in a subterranean formation.

In various embodiments, the present invention provides a method of treating a subterranean formation. The method includes obtaining or providing a composition including a compound including at least one silylating group and at least one ammonium group. The compound in the composition includes the structure:

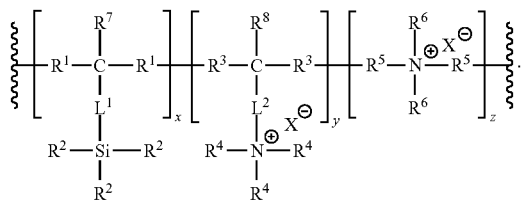

At each occurrence, each group having degree of polymerization x, y, and z is independently in a block or random arrangement and is independently oriented as shown or in the opposite orientation. At each occurrence, $R^1$, $R^3$, and $R^5$ are each independently selected from the group consisting of a bond, —O—, —$NR^7$—, —$N^+(R^7)_2 X^-$—, —S—, and a substituted or unsubstituted ($C_1$-$C_{20}$)hydrocarbylene at least one of interrupted and terminated with 0, 1, 2, or 3 groups independently selected from —O—, —$NR^7$—, —$N^+(R^7)_2 X^-$—, and —S—. At each occurrence, $R^2$ is independently selected from the group consisting of —OH, substituted or unsubstituted ($C_1$-$C_{20}$)hydrocarbyl, substituted or unsubstituted ($C_1$-$C_{20}$)hydrocarbyloxy, -$L^1$-$SiR^2_3$, -$L^2$-$N^+R^4_3 X^-$, and an inter- or intra-molecular crosslink to an Si atom. At each occurrence, $R^4$ and $R^6$ are each independently selected from the group consisting of —H, substituted or unsubstituted ($C_1$-$C_{20}$)hydrocarbyl, -$L^1$-$SiR^2_3$, and -$L^2$-$N^+R^4_3 X^-$. At each occurrence, $R^7$ and $R^8$ are each independently selected from the group consisting of —H, —OH, substituted or unsubstituted ($C_1$-$C_{20}$)hydrocarbyl, substituted or unsubstituted ($C_1$-$C_{20}$)hydrocarbyloxy, -$L^1$-$SiR^2_3$, and -$L^2$-$N^+ R^4_3 X^-$. At each occurrence, $L^1$ and $L^2$ are each independently selected from the group consisting of a bond, a poly(substituted or unsubstituted ($C_1$-$C_{20}$)hydrocarbyloxy), a poly(substituted or unsubstituted ($C_1$-$C_{20}$)hydrocarbylamino), and a substituted or unsubstituted ($C_1$-$C_{20}$)hydrocarbyl at least one of interrupted and terminated with 0, 1, 2, or 3 groups independently selected from —O—, —$NR^7$—, —$N^+(R^7)_2 X^-$—, and —S—, wherein each amino group is independently substituted or unsubstituted and is independently neutral or ammonium. The variable $X^-$ is a counterion. The sum x+y+z is greater than 0. The method also includes placing the composition in a subterranean formation.

In various embodiments, the present invention provides a system including a composition including a compound, the compound including at least one silylating group and at least one ammonium group. The system also includes a subterranean formation including the composition therein.

In various embodiments, the present invention provides a composition for treatment of a subterranean formation. The composition includes a compound including at least one silylating group and at least one ammonium group. The composition also includes at least one of a downhole fluid and a carrier fluid.

In various embodiments, the present invention provides a composition for treatment of a subterranean formation. The composition includes a compound including at least one silylating group and at least one ammonium group, the compound including the structure:

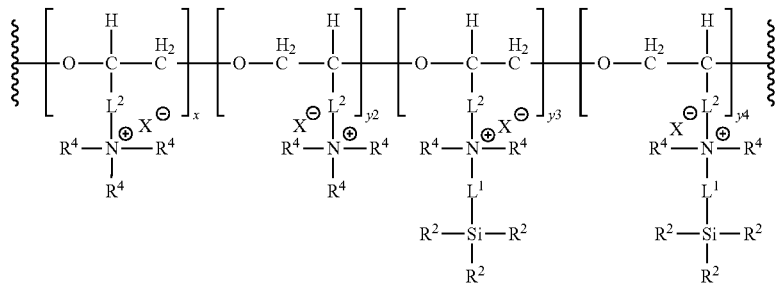

At each occurrence, each group having degree of polymerization y1, y2, y3, and y4 is independently in a block or random arrangement and is independently oriented as shown or in the opposite orientation. At each occurrence, $R^2$ is independently selected from ($C_1$-$C_5$)alkoxy. At each occurrence, $R^4$ is independently selected from ($C_1$-$C_5$)alkyl. At each occurrence, $L^2$ is independently selected from ($C_1$-$C_5$) alkylene. The sum y1+y2 is greater than 0. The sum y3+y4 is greater than 0. The composition also includes at least one of a downhole fluid and a carrier fluid.

In various embodiments, the present invention provides a composition for treatment of a subterranean formation. The composition includes a compound including at least one silylating group and at least one ammonium group, the compound having the structure:

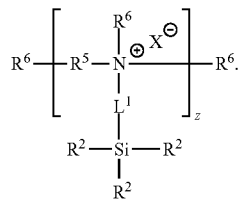

At each occurrence, $R^5$ is independently selected from the group consisting of a bond and $(C_1-C_{10})$alkyl. At each occurrence, $R^6$ is independently selected from the group consisting of —H, substituted or unsubstituted $(C_1-C_{10})$alkyl, and substituted or unsubstituted $(C_6-C_{20})$aryl. At each occurrence, $L^1$ and $L^2$ are each independently selected from the group consisting of a bond and a $(C_1-C_{10})$alkyl. At each occurrence, $R^2$ is independently selected from $(C_1-C_{10})$alkoxy.

In various embodiments, the present invention can provide certain advantages over other methods, composition, and systems for treatment of a subterranean formation, at least some of which are unexpected. In other methods, cations in the clay lattice which make it more prone to swelling can be substituted by other cations. However, this type of clay stabilization is typically temporary because the cations that have been used to replace the sodium cation or other cations are themselves quickly replaced by other cations (such as once flow from the well is reestablished). In some embodiments, the present invention can provide a substantially permanent and irreversible ion-exchange in clays. In various embodiments, the present invention can provide a more permanent and effective stabilization of clays against swelling. In various embodiments, the tethering of the compound to clays or fines can hold ammonium groups of the compound in place in the clay lattice, thereby preventing substitution by other less effective cations. Unlike other techniques to stabilize clay against swelling, in various embodiments, the tethering can also help to control migration of clays and fines. In various embodiments, the presence of multiple ammonium groups per molecule can provide a greater proportion of substitution of cations in the clay lattice than other compounds or techniques, providing more effective stabilization against swelling. In some embodiments, the proportion of ammonium groups in the compound can be tuned to match with the amount of swelling clays present in the formation mineralogy.

In other methods, tackifier materials have been used to help control migration of clays and other fines. However, a tackifier material cannot effectively protect clay against swelling, and often do not form covalent bonds to clays and fines. In various embodiments, the present invention can provide more permanent and effective mitigation of clays and fines migration. In various embodiments, the tethering can provide covalent bonds to clays and other fines, thereby holding them in place and preventing migration more effectively than other techniques.

In various embodiments, for a given cost the present invention can provide a greater degree of at least one of clay stabilization against swelling and mitigation of migration of clays and other fines as compared to other methods. In various embodiments, the present invention can help to avoid treating a formation with a separate clay swelling stabilizer treatment and a migration control treatment.

Method of Treating a Subterranean Formation.

In various embodiments, the present invention provides a method of treating a subterranean formation. The method includes placing a composition including a compound including at least one silylating group and at least one ammonium group in a subterranean formation. The ammonium group can be an ion-exchange clay-stabilizing group. The silylating group can be a tether group for a subterranean material including silylizable groups on a surface thereof. The silylating group can include a hydroxy-reactive organosilicone group, such that the silylating group is a tether group for a subterranean material including hydroxy-groups on a surface thereof. The method can be a method of at least one of clay stabilization and fines control. In various embodiments, the compound can not only control swelling of clays via ion-exchange of the ammonium groups but also can stop migration of fines (both swelling clays and migrating clays) by tethering or anchoring at least one of clay, sand, and other subterranean materials together via the silylating groups. In some embodiments, the clay stabilization can be long-lasting or permanent, due to tethering or anchoring of the compound including the ammonium group near the ion-exchange site.

The method of treating a subterranean formation can include obtaining or providing a composition including the compound including at least one silylating group and at least one ammonium group. The obtaining or providing of the composition can occur at any suitable time and at any suitable location. The obtaining or providing of the composition can occur above the surface. The obtaining or providing of the composition can occur in the subterranean formation (e.g., downhole). The method also includes placing the composition in a subterranean formation. The placing of the composition in the subterranean formation can include contacting the composition and any suitable part of the subterranean formation, or contacting the composition and a subterranean material, such as any suitable subterranean material, such as clays and fines therein. The subterranean formation can be any suitable subterranean formation. In some examples, the placing of the composition in the subterranean formation includes contacting the composition with or placing the composition in at least one of a fracture, at least a part of an area surrounding a fracture, a flow pathway, an area surrounding a flow pathway, and an area desired to be fractured. The placing of the composition in the subterranean formation can be any suitable placing and can include any suitable contacting between the subterranean formation and the composition. The placing of the composition in the subterranean formation can include at least partially depositing the composition in a wellbore, fracture, flow pathway, or area surrounding the same.

The method can include hydraulic fracturing, such as a method of hydraulic fracturing to generate a fracture or flow pathway. The placing of the composition in the subterranean formation or the contacting of the subterranean formation and the hydraulic fracturing can occur at any time with respect to one another; for example, the hydraulic fracturing can occur at least one of before, during, and after the contacting or placing. In some embodiments, the contacting or placing occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, with some viscosifier, such as to begin to break into an area and initiate fractures to produce sufficient penetration and width to allow proppant-laden later stages to enter), or a slurry stage of the fracturing (e.g., viscous fluid with proppant). The method can include performing a stimulation treatment at least one of before, during, and after placing the composition in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the composition is placed or contacted, or the composition is placed or contacted to an area surrounding the generated fracture or flow pathway.

Any suitable amount of the composition can be one or more compounds including at least one silylating group and at least one ammonium group. For example, about 0.000,1 wt % to about 100 wt % of the composition can be the one or more compounds, or about 0.01 wt % to about 99.99 wt %, or about 0.000,1 wt % or less, or about 0.001 wt %, 0.01, 0.1, 1, 2, 3, 4, 5, 6, 8, 10, 12, 14, 16, 18, 20, 25, 30, 35, 40, 45, 50, 55, 60, 65, 70, 75, 80, 85, 86, 88, 90, 92, 94, 95, 96, 97, 98, 99, 99.9, 99.99 wt %, or about 99.999 wt % or more. In some embodiments, the remainder of the composition includes a carrier fluid or a downhole fluid. For example, about 0.01 wt % to about 99.999 wt % of the composition can be at least one of a carrier fluid and a downhole fluid, or about 0.01 wt % or less, or about 0.1 wt %, 1, 2, 3, 4, 5, 6, 8, 10, 12, 14, 16, 18, 20, 25, 30, 35, 40, 45, 50, 55, 60, 65, 70, 75, 80, 85, 86, 88, 90, 92, 94, 95, 96, 97, 98, 99, 99.9, 99.99 wt %, or about 99.999 wt % or more. In various embodiments, the method can include forming a combination of the one or more compounds and at least one of a carrier fluid and a downhole fluid to form the composition; for example, the method can include combining the compound including at least one silylating group and at least one ammonium group with at least one of a carrier fluid and a downhole fluid at least one of prior to placing the composition in the subterranean formation and while the composition is in the subterranean formation. In some embodiments, the method can be a method of drilling, stimulation, fracturing, spotting, clean-up, completion, remedial treatment, applying a pill, acidizing, cementing, or a combination thereof.

Compound Including at Least One Silylating Group and at Least One Ammonium Group.

At least one ammonium group in the compound including at least one silylating group and at least one ammonium group can be an ion-exchange clay stabilizing group that can exchange with a cation present in the clay to provide a more swell-resistant or a more non-swelling clay. At least one silylating group in the compound including at least one silylating group and at least one ammonium group can be a hydroxy-reactive organosilicone group that can react with to tether the compound to one or more subterranean materials having hydroxy-groups on a surface thereof. For example, a subterranean surface having an —OH group can react with the hydroxy-reactive organosilicon group to form a covalent bond to the subterranean surface via an —O— group, such the linkage (subterranean surface)-O—Si wherein the Si-atom is the silicon atom of the organosilicon group that had the hydroxy-reactive group substituted thereon.

In various embodiments, the compound including at least one silylating group and at least one ammonium group includes the structure:

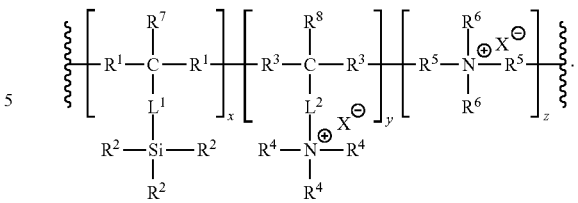

At each occurrence, each group having degree of polymerization x, y, and z is independently in a block or random arrangement and is independently oriented as shown or in the opposite orientation. At each occurrence, $R^1$, $R^3$, and $R^5$ can each independently be selected from the group consisting of a bond, —O—, —$NR^7$—, —$N^+(R^7)_2X^-$—, —S—, and a substituted or unsubstituted ($C_1$-$C_{20}$)hydrocarbylene at least one of interrupted and terminated with 0, 1, 2, or 3 groups independently selected from —O—, —$NR^7$—, —$N^+(R^7)_2X^-$—, and —S—. In some embodiments, one of $R^1$, $R^3$, and $R^5$ in each repeating group can be independently a heteroatom-containing group selected from —O—, —$NR^7$—, —$N^+(R^7)_2X^-$—, and —S—, while the other $R^1$, $R^3$, or $R^5$ can be independently selected from a bond and a substituted or unsubstituted ($C_1$-$C_{20}$)hydrocarbylene. At each occurrence, $R^2$ can be independently selected from the group consisting of —OH, substituted or unsubstituted ($C_1$-$C_{20}$)hydrocarbyl, substituted or unsubstituted ($C_1$-$C_{20}$) hydrocarbyloxy, -$L^1$-$SiR^2_3$, -$L^2$-$N^+R^4_3X^-$, and an inter- or intra-molecular crosslink to an Si atom. The compound includes at least one silylating group, such as a Si—OH or Si—O-hydrocarbyl; in some embodiments, at least one $R^2$ can be —OH or substituted or unsubstituted ($C_1$-$C_{20}$)hydrocarbyloxy or at least one $R^2$ can include an Si—OH or Si—O-(substituted or unsubstituted ($C_1$-$C_{20}$)hydrocarbyl). At each occurrence, $R^4$ and $R^6$ can be each independently selected from the group consisting of —H, substituted or unsubstituted ($C_1$-$C_{20}$)hydrocarbyl, -$L^1$-$SiR^2_3$, and -$L^2$-$N^+R^4_3X^-$. At each occurrence, $R^7$ and $R^8$ can be each independently selected from the group consisting of —H, —OH, substituted or unsubstituted ($C_1$-$C_{20}$)hydrocarbyl, substituted or unsubstituted ($C_1$-$C_{20}$)hydrocarbyloxy, -$L^1$-$SiR^2_3$, and -$L^2$-$N^+R^4_3X^-$. At each occurrence, $L^1$ and $L^2$ can be each independently selected from the group consisting of a bond, a poly(substituted or unsubstituted ($C_1$-$C_{20}$)hydrocarbyloxy), a poly(substituted or unsubstituted ($C_1$-$C_{20}$)hydrocarbylamino), and a substituted or unsubstituted ($C_1$-$C_{20}$) hydrocarbyl at least one of interrupted and terminated with 0, 1, 2, or 3 groups independently selected from —O—, —$NR^7$—, —$N^+(R^7)_2X^-$—, and —S—, wherein each amino group can be independently substituted or unsubstituted and is independently neutral or ammonium. The variable $X^-$ can be a counterion. The variables x, y, and z can be integers, wherein the sum x+y+z is greater than 0. The compound can be a polymer (e.g., at least one of x, y, and z is greater than 1) or a non-polymer (e.g., none of x, y, or z is greater than 1 and no other group present in the compound is a repeating group). In addition to the group shown in the structure, any other suitable group can be present in the molecule, such as a repeating group or a non-repeating group. In some embodiments, other groups in the compound, if present, can have similar structures to those groups having degree of polymerization x or y, but have -$L^1$-$SiR^2_3$ or -$L^2$-$N^+R^4_3X^-$ replaced by another group such as —H or a substituted or unsubstituted ($C_1$-$C_{20}$)hydrocarbylene, or can have a similar structure to that group having degree of polymerization z but with a neutral charge on the nitrogen atom (e.g., only one $R^6$ substituent).

At each occurrence, $R^1$, $R^3$, and $R^5$ can each independently be selected from the group consisting of a bond, —O—, —$NR^7$—, —$N^+(R^7)_2X^-$—, —S—, and a substituted or unsubstituted $(C_1-C_{20})$hydrocarbylene at least one of interrupted and terminated with 0, 1, 2, or 3 groups independently selected from —O—, —$NR^7$—, —$N^+(R^7)_2X^-$—, and —S—. At each occurrence, $R^1$, $R^3$, and $R^5$ can be each independently selected from the group consisting of a bond, —O—, a $(C_1-C_{20})$hydrocarbylene substituted with 0, 1, 2, or 3 hydroxy-groups, and a $(C_1-C_{20})$hydrocarbyloxy substituted with 0, 1, 2, or 3 hydroxy-groups. At each occurrence, $R^1$, $R^3$, and $R^5$ can be each independently selected from the group consisting of a bond, —O—, a $(C_1-C_{10})$alkyl substituted with 0, 1, 2, or 3 hydroxy-groups, and a $(C_1-C_{10})$alkoxy substituted with 0, 1, 2, or 3 hydroxy-groups. At each occurrence, $R^1$, $R^3$, and $R^5$ can be each independently selected from the group consisting of a bond, —O—, —$CH_2$—O—, —$CH(OH)$—$CH_2$—O—, and $(C_1-C_{10})$alkyl.

At each occurrence, $R^2$ can be independently selected from the group consisting of —OH, substituted or unsubstituted $(C_1-C_{20})$hydrocarbyl, substituted or unsubstituted $(C_1-C_{20})$hydrocarbyloxy, -$L^1$-$SiR^2_3$, -$L^2$-$N^+R^4_3X^-$, and an inter- or intra-molecular crosslink to an Si atom. At each occurrence, $R^2$ can be independently selected from the group consisting of $(C_1-C_{20})$hydrocarbyl substituted with 0, 1, 2, or 3 hydroxy-groups and $(C_1-C_{20})$hydrocarbyloxy substituted with 0, 1, 2, or 3 hydroxy-groups. At each occurrence, $R^2$ can be independently selected from $(C_1-C_{10})$alkoxy substituted with 0, 1, 2, or 3 hydroxy-groups. At each occurrence, $R^2$ can be independently selected from the group consisting of —$CH_3$, —$OCH_3$, —$CH_2CH_3$, —$OCH_2CH_3$, —$CH_2CH_3$—OH, —$OCH_2CH_3$—OH, and cyclohexyl.

At each occurrence, $R^4$ and $R^6$ can be each independently selected from the group consisting of —H, substituted or unsubstituted $(C_1-C_{20})$hydrocarbyl, -$L^1$-$SiR^2_3$, and -$L^2$-$N^+R^4_3X^-$. At each occurrence, $R^4$ and $R^6$ can be each independently selected from the group consisting of —H and $(C_1-C_{20})$hydrocarbyl substituted with 0, 1, 2, or 3 hydroxy-groups. At each occurrence, $R^4$ and $R^6$ can be each independently selected from the group consisting of —H, $(C_1-C_{10})$alkyl substituted with 0, 1, 2, or 3 hydroxy-groups, and substituted or unsubstituted $(C_6-C_{20})$aryl. At each occurrence, $R^4$ and $R^6$ can be each independently selected from the group consisting of —H, $(C_1-C_{10})$alkyl, —$CH_3$, —$CH_2CH_3$, —$CH_2CH_3$—OH, cyclohexyl, and phenyl.

At each occurrence, $R^7$ and $R^8$ can be each independently selected from the group consisting of —H, —OH, substituted or unsubstituted $(C_1-C_{20})$hydrocarbyl, substituted or unsubstituted $(C_1-C_{20})$hydrocarbyloxy, -$L^1$-$SiR^2_3$, and -$L^2$-$N^+R^4_3X^-$. At each occurrence, $R^7$ and $R^8$ can be each independently selected from the group consisting of —H, —OH, and $(C_1-C_{10})$alkoxy, and $(C_1-C_{10})$alkyl. At each occurrence, $R^7$ and $R^8$ can be each independently selected from the group consisting of —H, —OH, and $(C_1-C_5)$alkyl. At each occurrence, $R^7$ and $R^8$ can each be —H.

At each occurrence, $L^1$ and $L^2$ can be each independently selected from the group consisting of a bond, a poly(substituted or unsubstituted $(C_1-C_{20})$hydrocarbyloxy), a poly(substituted or unsubstituted $(C_1-C_{20})$hydrocarbylamino), and a substituted or unsubstituted $(C_1-C_{20})$hydrocarbyl at least one of interrupted and terminated with 0, 1, 2, or 3 groups independently selected from —O—, —$NR^7$—, —$N^7$—$(R^7)_2X^-$—, and —S—, wherein each amino group can be independently substituted or unsubstituted and is independently neutral or ammonium. At each occurrence, $L^1$ and $L^2$ can each be independently selected from the group consisting of a bond, a poly$((C_1-C_{20})$hydrocarbyloxy), a poly$((C_1-C_{20})$hydrocarbylamino), and a $(C_1-C_{20})$hydrocarbyl. At each occurrence, $L^1$ and $L^2$ can each be independently selected from the group consisting of a bond, a poly(substituted or unsubstituted $(C_2-C_{10})$alkyloxy), a poly$((C_2-C_{20})$ alkylamino), and a $(C_1-C_{10})$alkyl substituted with 0, 1, 2, or 3 hydroxy-groups. At each occurrence, $L^1$ and $L^2$ can each be independently selected from the group consisting of a bond, and a $(C_1-C_{10})$alkyl. At each occurrence, $L^1$ and $L^2$ can each be independently selected from the group consisting of a bond, methylene, ethylene, propylene, and butylene.

The variable $X^-$ can be any suitable negatively charged counterion, having any suitable degree of nucleophilicity. For example, the counterion can be a halide, such as fluoro, chloro, iodo, or bromo. In other examples, the counterion can be nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate. The counterion can be a conjugate base of any carboxylic acid, such as acetate or formate. In some embodiments, a counterion can have a negative charge greater than –1, which can in some embodiments complex to multiple ionized groups, such as oxide, sulfide, nitride, arsenate, phosphate, arsenite, hydrogen phosphate, sulfate, thiosulfate, sulfite, carbonate, chromate, dichromate, peroxide, tetrafluoroborate, hexafluorophosphate, or oxalate.

The sum x+y+z is greater than 0. The variable x can have any suitable value, such that the compound can be used as described herein, such as about 0 to about 500,000, or about 1 to about 100,000, or about 0, 1, 2, 3, 4, 5, 6, 8, 10, 12, 14, 16, 18, 20, 25, 30, 35, 40, 45, 50, 75, 100, 125, 150, 175, 200, 250, 500, 1,000, 1,500, 2,000, 5,000, 7,500, 10,000, 15,000, 20,000, 25,000, 50,000, 100,000, about 200,000, or about 500,000 or more. The variable y can have any suitable value, such that the compound can be used as described herein, such as about 0 to about 500,000, or about 1 to about 100,000, or about 0, 1, 2, 3, 4, 5, 6, 8, 10, 12, 14, 16, 18, 20, 25, 30, 35, 40, 45, 50, 75, 100, 125, 150, 175, 200, 250, 500, 1,000, 1,500, 2,000, 5,000, 7,500, 10,000, 15,000, 20,000, 25,000, 50,000, 100,000, about 200,000, or about 500,000 or more. The variable z can have any suitable value, such that the compound can be used as described herein, such as about 0 to about 500,000, or about 1 to about 100,000, or about 0, 1, 2, 3, 4, 5, 6, 8, 10, 12, 14, 16, 18, 20, 25, 30, 35, 40, 45, 50, 75, 100, 125, 150, 175, 200, 250, 500, 1,000, 1,500, 2,000, 5,000, 7,500, 10,000, 15,000, 20,000, 25,000, 50,000, 100,000, about 200,000, or about 500,000 or more.

The compound including at least one silylating group and at least one ammonium group can have any suitable molecular weight, such that the compound can be used as described herein, such as about 200 g/mol to about 50,000,000 g/mol, or about 200 g/mol or less, about 300 g/mol, 400, 500, 750, 1,000, 1,500, 2,000, 5,000, 7,500, 10,000, 15,000, 20,000, 25,000, 50,000, 100,000, 150,000, 200,000, 250,000, 500, 000, 750,000, 1,000,000, 2,000,000, 5,000,000, 10,000,000, 25,000,000 g/mol, or about 50,000,000 g/mol or more.

In some embodiments, the compound including at least one silylating group and at least one ammonium group has the structure:

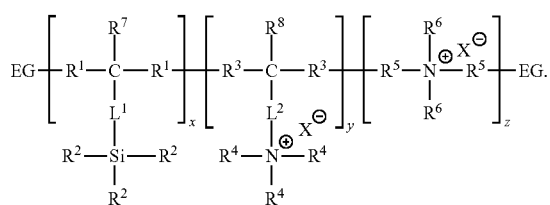

At each occurrence, each group having degree of polymerization x, y, and z is independently in a block or random arrangement and is independently oriented as shown or in the opposite orientation. At each occurrence, EG (e.g., end group) can be independently selected from the group consisting of —H, -$L^1$-$SiR^2_3$, and -$L^2$-$N^+R^4_3X^-$, a poly(substituted or unsubstituted ($C_1$-$C_{20}$)hydrocarbyloxy), a poly(substituted or unsubstituted ($C_1$-$C_{20}$)hydrocarbylamino), and a substituted or unsubstituted ($C_1$-$C_{20}$)hydrocarbyl at least one of interrupted and terminated with 0, 1, 2, or 3 groups independently selected from —O—, —$NR^7$—, —$N^+(R^7)_2$ $X^-$—, and —S—, wherein each amino group can be independently substituted or unsubstituted and is independently neutral or ammonium. At each occurrence, EG can be independently selected from the group consisting of —H, substituted or unsubstituted ($C_1$-$C_{10}$)alkyl, and substituted or unsubstituted ($C_6$-$C_{20}$)aryl. At each occurrence, EG can be —H.

In some embodiments, the compound including at least one silylating group and at least one ammonium group can include at least one of the structures:

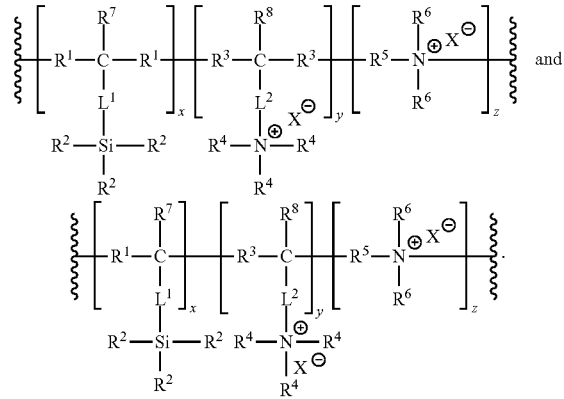

At each occurrence, each group having degree of polymerization x, y, and z is independently in a block or random arrangement and is independently oriented as shown or in the opposite orientation.

In some embodiments, the compound including at least one silylating group and at least one ammonium group has the structure:

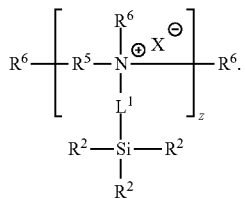

At each occurrence, $R^5$ can be independently selected from the group consisting of a bond and ($C_1$-$C_{10}$)alkyl, such as a bond or ethylene. At each occurrence, EG can be $R^6$. At each occurrence, $R^6$ can be independently selected from the group consisting of —H, substituted or unsubstituted ($C_1$-$C_{10}$) alkyl, and substituted or unsubstituted ($C_6$-$C_{20}$)aryl. At each occurrence, $L^1$ and $L^2$ can be each independently selected from the group consisting of a bond and a ($C_1C_{10}$)alkyl, such as propyl. At each occurrence, $R^2$ can be independently selected from ($C_1$-$C_{10}$)alkoxym, such as —$OCH_3$. The variable z can be about 2 to about 100,000. In some embodiments, the compound including at least one silylating group and at least one ammonium group has the structure:

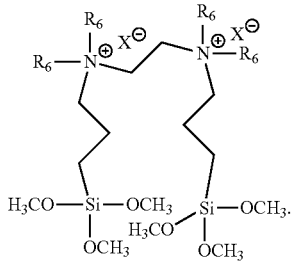

For example, $R^6$ can be —H and $X^-$ can be a halide such as $Cl^-$.

In some embodiments, the compound including at least one silylating group and at least one ammonium group has the structure:

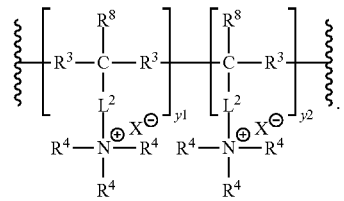

The groups having degree of polymerization y1 and y2 are in a block or random arrangement, and y1+y2=y. The variables y1 and y2 can be integers. The variable y1 can have any suitable value, such that the compound can be used as described herein, such as about 0 to about 500,000, or about 1 to about 100,000, or about 0, 1, 2, 3, 4, 5, 6, 8, 10, 12, 14, 16, 18, 20, 25, 30, 35, 40, 45, 50, 75, 100, 125, 150, 175, 200, 250, 500, 1,000, 1,500, 2,000, 5,000, 7,500, 10,000, 15,000, 20,000, 25,000, 50,000, 100,000, about 200,000, or about 500,000 or more. The variable y2 can have any suitable value, such that the compound can be used as described herein, such as about 0 to about 500,000, or about 1 to about 100,000, or about 0, 1, 2, 3, 4, 5, 6, 8, 10, 12, 14, 16, 18, 20, 25, 30, 35, 40, 45, 50, 75, 100, 125, 150, 175, 200, 250, 500, 1,000, 1,500, 2,000, 5,000, 7,500, 10,000, 15,000, 20,000, 25,000, 50,000, 100,000, about 200,000, or about 500,000 or more.

The compound including at least one silylating group and at least one ammonium group can include the structure:

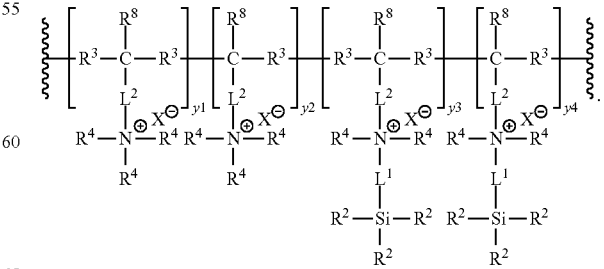

The groups having degree of polymerization y1, y2, y3, and y4 are in a block or random arrangement, y1+y2+y3+y4=y, y1+y2 can be greater than 0, and y3+y4 can be greater than 0. The variables y1, y2, y3, and y4 can be integers. The variable y3 can have any suitable value, such that the compound can be used as described herein, such as about 0 to about 500,000, or about 1 to about 100,000, or about 0, 1, 2, 3, 4, 5, 6, 8, 10, 12, 14, 16, 18, 20, 25, 30, 35, 40, 45, 50, 75, 100, 125, 150, 175, 200, 250, 500, 1,000, 1,500, 2,000, 5,000, 7,500, 10,000, 15,000, 20,000, 25,000, 50,000, 100,000, about 200,000, or about 500,000 or more. The variable y4 can have any suitable value, such that the compound can be used as described herein, such as about 0 to about 500,000, or about 1 to about 100,000, or about 0, 1, 2, 3, 4, 5, 6, 8, 10, 12, 14, 16, 18, 20, 25, 30, 35, 40, 45, 50, 75, 100, 125, 150, 175, 200, 250, 500, 1,000, 1,500, 2,000, 5,000, 7,500, 10,000, 15,000, 20,000, 25,000, 50,000, 100,000, about 200,000, or about 500,000 or more. The sum of each of y1+y2 and y3+y4 can independently can have any suitable value, such that the compound can be used as described herein, such as about 1 to about 500,000, or about 1 to about 100,000, or about 0, 1, 2, 3, 4, 5, 6, 8, 10, 12, 14, 16, 18, 20, 25, 30, 35, 40, 45, 50, 75, 100, 125, 150, 175, 200, 250, 500, 1,000, 1,500, 2,000, 5,000, 7,500, 10,000, 15,000, 20,000, 25,000, 50,000, 100,000, about 200,000, or about 500,000 or more.

The compound including at least one silylating group and at least one ammonium group can include the structure:

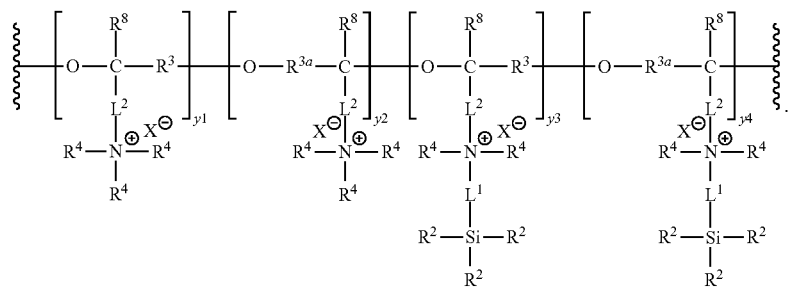

The groups having degree of polymerization y1, y2, y3, and y4 are in a block or random arrangement, y1+y2+y3+y4=y, y1+y2 can be greater than 0, and y3+y4 can be greater than 0. At each occurrence, $R^2$ can be independently selected from $(C_1$-$C_5)$alkoxy. At each occurrence, $R^{3a}$ can be independently selected from $(C_1$-$C_5)$alkylene. At each occurrence, $R^4$ can be independently selected from $(C_1$-$C_5)$alkyl. At each occurrence, $R^8$ can be independently selected from —H and $(C_1$-$C_5)$alkyl. At each occurrence $L^2$ can be independently selected from $(C_1$-$C_5)$alkylene.

In some embodiments, the compound including at least one silylating group and at least one ammonium group includes the structure:

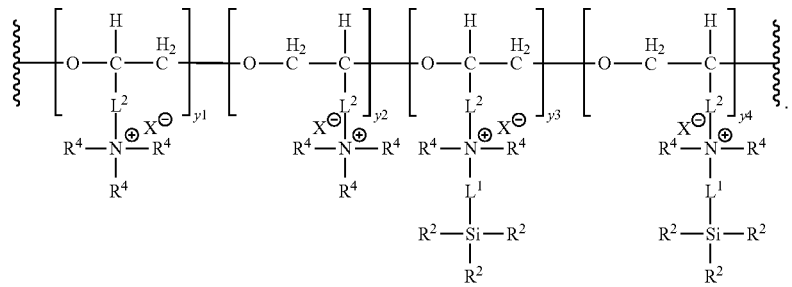

The groups having degree of polymerization y1, y2, y3, and y4 are in a block or random arrangement, y1+y2+y3+y4=y, y1+y2 can be greater than 0, and y3+y4 can be greater than 0. At each occurrence, $R^2$ can be independently selected from $(C_1$-$C_5)$alkoxy. At each occurrence, $R^4$ can be independently selected from $(C_1$-$C_5)$alkyl. At each occurrence, $L^2$ can be independently selected from $(C_1$-$C_5)$alkylene. The variable EG (e.g., end groups) can be —H or —OH, depending on the repeating unit to which it is bound (e.g., —H for repeating unit terminating in oxygen, —OH for repeating unit terminating in carbon). The compound including at least one silylating group and at least one ammonium group can have the structure:

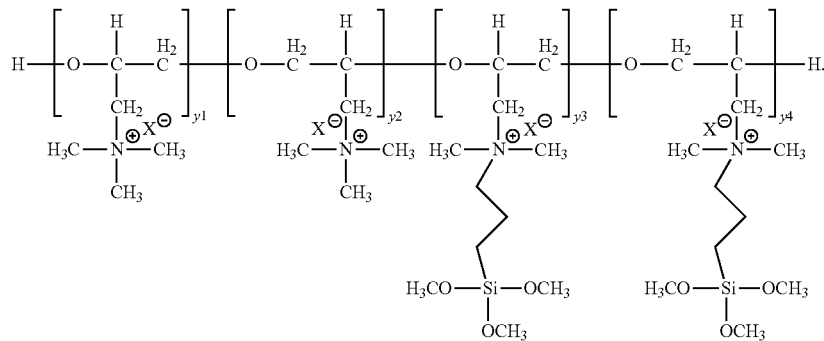

The groups having degree of polymerization y1, y2, y3, and y4 are in a block or random arrangement, y1+y2+y3+y4=y, y1+y2 can be greater than 0, and y3+y4 can be greater than 0. In various embodiments, the compound can be generated by combining 1,2-epoxy-3-chloropropant under conditions sufficient for polymerization, such as in the presence of base (e.g., NaOH) and an appropriate solvent (e.g., water), to give a poly(ethoxylene) structure having pendant chloromethylene units thereon. The polymer can then be allowed to react with a trialkylamine (e.g., trimethylamine) and a trialkoxysilylalkyldialkylamine (e.g., trimethoxysilylpropyldimethylamine), in the presence of acid (e.g., HCl), allowing some of the chloro-substituted carbons to react with the amino groups to form substituted trialkylammonium groups (e.g. trimethylammonium) and trialkoxysilylalkyldialkylammonium groups (e.g., trimethoxysilylpropyldimethylammonium). An example technique for generating the compound is illustrated in Scheme 1.

Other Components.

The composition including the compound comprising at least one silylating group and at least one ammonium group, or a mixture including the composition, can include any suitable additional component in any suitable proportion, such that the composition, or mixture including the same, can be used as described herein.

In some embodiments, the composition includes a viscosifier. The viscosifier can be any suitable viscosifier. The viscosifier can affect the viscosity of the composition or a solvent that contacts the composition at any suitable time and location. In some embodiments, the viscosifier provides an increased viscosity at least one of before injection into the subterranean formation, at the time of injection into the subterranean formation, during travel through a tubular disposed in a borehole, once the composition reaches a particular subterranean location, or some period of time after the composition reaches a particular subterranean location. In some embodiments, the viscosifier can be about 0.000,1 wt % to about 10 wt % of the composition, about 0.004 wt

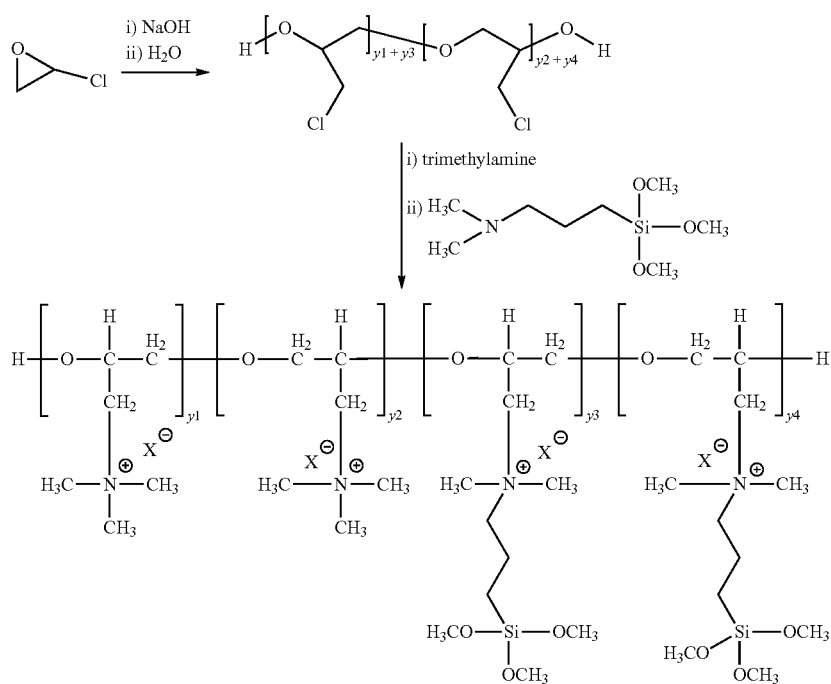

% to about 0.01 wt % of the composition, or about 0.000,1 wt % or less, 0.000,5 wt %, 0.001, 0.005, 0.01, 0.05, 0.1, 0.5, 1, 2, 3, 4, 5, 6, 7, 8, 9, or about 10 wt % or more of the composition.

The viscosifier can include at least one of a substituted or unsubstituted polysaccharide, and a substituted or unsubstituted polyalkenylene, wherein the polysaccharide or polyalkenylene is crosslinked or uncrosslinked. The viscosifier can include a polymer including at least one monomer selected from the group consisting of ethylene glycol, acrylamide, vinyl acetate, 2-acrylamidomethylpropane sulfonic acid or its salts, trimethylammoniumethyl acrylate halide, and trimethylammoniumethyl methacrylate halide. The viscosifier can include a crosslinked gel or a crosslinkable gel. The viscosifier can include at least one of a linear polysaccharide, and poly(($C_2$-$C_{10}$)alkenylene), wherein the ($C_2$-$C_{10}$)alkenylene is substituted or unsubstituted. The viscosifier can include at least one of poly(acrylic acid) or ($C_1$-$C_5$) alkyl esters thereof, poly(methacrylic acid) or ($C_1$-$C_5$)alkyl esters thereof, poly(vinyl acetate), poly(vinyl alcohol), poly (ethylene glycol), poly(vinyl pyrrolidone), polyacrylamide, poly (hydroxyethyl methacrylate), alginate, chitosan, curdlan, dextran, emulsan, a galactoglucopolysaccharide, gellan, glucuronan, N-acetyl-glucosamine, N-acetyl-heparosan, hyaluronic acid, kefiran, lentinan, levan, mauran, pullulan, scleroglucan, schizophyllan, stewartan, succinoglycan, xanthan, welan, derivatized starch, tamarind, tragacanth, guar gum, derivatized guar (e.g., hydroxypropyl guar, carboxy methyl guar, or carboxymethyl hydroxypropyl guar), gum ghatti, gum arabic, locust bean gum, and derivatized cellulose (e.g., carboxymethyl cellulose, hydroxyethyl cellulose, carboxymethyl hydroxyethyl cellulose, hydroxypropyl cellulose, or methyl hydroxy ethyl cellulose).

In some embodiments, the viscosifier can include at least one of a poly(vinyl alcohol) homopolymer, poly(vinyl alcohol) copolymer, a crosslinked poly(vinyl alcohol) homopolymer, and a crosslinked poly(vinyl alcohol) copolymer. The viscosifier can include a poly(vinyl alcohol) copolymer or a crosslinked poly(vinyl alcohol) copolymer including at least one of a graft, linear, branched, block, and random copolymer of vinyl alcohol and at least one of a substituted or unsubstituted ($C_2$-$C_{50}$)hydrocarbyl having at least one aliphatic unsaturated C—C bond therein, and a substituted or unsubstituted ($C_2$-$C_{50}$)alkene. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl phosphonic acid, vinylidene diphosphonic acid, substituted or unsubstituted 2-acrylamido-2-methylpropanesulfonic acid, a substituted or unsubstituted ($C_1$-$C_{20}$)alkenoic acid, propenoic acid, butenoic acid, pentenoic acid, hexenoic acid, octenoic acid, nonenoic acid, decenoic acid, acrylic acid, methacrylic acid, hydroxypropyl acrylic acid, acrylamide, fumaric acid, methacrylic acid, hydroxypropyl acrylic acid, vinyl phosphonic acid, vinylidene diphosphonic acid, itaconic acid, crotonic acid, mesoconic acid, citraconic acid, styrene sulfonic acid, allyl sulfonic acid, methallyl sulfonic acid, vinyl sulfonic acid, and a substituted or unsubstituted ($C_1$-$C_{20}$)alkyl ester thereof. The viscosifier can include a poly(vinyl alcohol) copolymer or a crosslinked poly(vinyl alcohol) copolymer including at least one of a graft, linear, branched, block, and random copolymer of vinyl alcohol and at least one of vinyl acetate, vinyl propanoate, vinyl butanoate, vinyl pentanoate, vinyl hexanoate, vinyl 2-methyl butanoate, vinyl 3-ethyl-pentanoate, and vinyl 3-ethylhexanoate, maleic anhydride, a substituted or unsubstituted ($C_1$-$C_{20}$)alkenoic substituted or unsubstituted ($C_1$-$C_{20}$)alkanoic anhydride, a substituted or unsubstituted ($C_1$-$C_{20}$)alkenoic substituted or unsubstituted ($C_1$-$C_{20}$)alkenoic anhydride, propenoic acid anhydride, butenoic acid anhydride, pentenoic acid anhydride, hexenoic acid anhydride, octenoic acid anhydride, nonenoic acid anhydride, decenoic acid anhydride, acrylic acid anhydride, fumaric acid anhydride, methacrylic acid anhydride, hydroxypropyl acrylic acid anhydride, vinyl phosphonic acid anhydride, vinylidene diphosphonic acid anhydride, itaconic acid anhydride, crotonic acid anhydride, mesoconic acid anhydride, citraconic acid anhydride, styrene sulfonic acid anhydride, allyl sulfonic acid anhydride, methallyl sulfonic acid anhydride, vinyl sulfonic acid anhydride, and an N—($C_1$-$C_{10}$)alkenyl nitrogen containing substituted or unsubstituted ($C_1$-$C_{10}$)heterocycle. The viscosifier can include a poly(vinyl alcohol) copolymer or a crosslinked poly(vinyl alcohol) copolymer including at least one of a graft, linear, branched, block, and random copolymer that includes a poly(vinylalcohol/acrylamide) copolymer, a poly (vinylalcohol/2-acrylamido-2-methylpropanesulfonic acid) copolymer, a poly (acrylamide/2-acrylamido-2-methylpropanesulfonic acid) copolymer, or a poly(vinylalcohol/N-vinylpyrrolidone) copolymer. The viscosifier can include a crosslinked poly(vinyl alcohol) homopolymer or copolymer including a crosslinker including at least one of chromium, aluminum, antimony, zirconium, titanium, calcium, boron, iron, silicon, copper, zinc, magnesium, and an ion thereof. The viscosifier can include a crosslinked poly(vinyl alcohol) homopolymer or copolymer including a crosslinker including at least one of an aldehyde, an aldehyde-forming compound, a carboxylic acid or an ester thereof, a sulfonic acid or an ester thereof, a phosphonic acid or an ester thereof, an acid anhydride, and an epihalohydrin.

In various embodiments, the composition can include a crosslinker. The crosslinker can be any suitable crosslinker. In some examples, the crosslinker can be incorporated in a crosslinked viscosifier, and in other examples, the crosslinker can crosslink a crosslinkable material (e.g., downhole). The crosslinker can include at least one of chromium, aluminum, antimony, zirconium, titanium, calcium, boron, iron, silicon, copper, zinc, magnesium, and an ion thereof. The crosslinker can include at least one of boric acid, borax, a borate, a ($C_1$-$C_{30}$)hydrocarbylboronic acid, a ($C_1$-$C_{30}$) hydrocarbyl ester of a ($C_1$-$C_{30}$)hydrocarbylboronic acid, a ($C_1$-$C_{30}$)hydrocarbylboronic acid-modified polyacrylamide, ferric chloride, disodium octaborate tetrahydrate, sodium metaborate, sodium diborate, sodium tetraborate, disodium tetraborate, a pentaborate, ulexite, colemanite, magnesium oxide, zirconium lactate, zirconium triethanol amine, zirconium lactate triethanolamine, zirconium carbonate, zirconium acetylacetonate, zirconium malate, zirconium citrate, zirconium diisopropylamine lactate, zirconium glycolate, zirconium triethanol amine glycolate, zirconium lactate glycolate, titanium lactate, titanium malate, titanium citrate, titanium ammonium lactate, titanium triethanolamine, titanium acetylacetonate, aluminum lactate, and aluminum citrate. In some embodiments, the crosslinker can be a ($C_1$-$C_{20}$)alkylenebiacrylamide (e.g., methylenebisacrylamide), a poly(($C_1$-$C_{20}$)alkenyl)-substituted mono- or poly-($C_1$-$C_{20}$) alkyl ether (e.g., pentaerythritol allyl ether), and a poly($C_2$-$C_{20}$)alkenylbenzene (e.g., divinylbenzene). In some embodiments, the crosslinker can be at least one of alkyl diacrylate, ethylene glycol diacrylate, ethylene glycol dimethacrylate, polyethylene glycol diacrylate, polyethylene glycol dimethacrylate, ethoxylated bisphenol A diacrylate, ethoxylated bisphenol A dimethacrylate, ethoxylated trimethylol propane triacrylate, ethoxylated trimethylol propane trimethacrylate, ethoxylated glyceryl triacrylate, ethoxylated glyceryl trimethacrylate, ethoxylated pentaerythritol tetraacrylate, ethoxylated pentaerythritol tetramethacrylate, ethoxylated dipentaerythritol hexaacrylate, polyglyceryl monoethylene oxide polyacrylate, polyglyceryl polyethylene glycol polyacrylate, dipentaerythritol hexaacrylate, dipentaerythritol hexamethacrylate, neopentyl glycol diacrylate, neopentyl glycol dimethacrylate, pentaerythritol triacrylate, pentaerythritol trimethacrylate, trimethylol propane triacrylate, trimethylol propane trimethacrylate, tricyclodecane dimethanol diacrylate, tricyclodecane dimethanol dimethacrylate, 1,6-hexanediol diacrylate, and 1,6-hexanediol dimethacrylate. The crosslinker can be about 0.000,01 wt % to about 5 wt % of the composition, about 0.001 wt % to about 0.01 wt %, or about 0.000,01 wt % or less, or about 0.000,05 wt %, 0.000,1, 0.000,5, 0.001, 0.005, 0.01, 0.05, 0.1, 0.5, 1, 2, 3, 4, or about 5 wt % or more.

In some embodiments, the composition can include a breaker. The breaker can be any suitable breaker, such that the surrounding fluid (e.g., a fracturing fluid) can be at least partially broken for more complete and more efficient recovery thereof, such as at the conclusion of the hydraulic fracturing treatment. In some embodiments, the breaker can be encapsulated or otherwise formulated to give a delayed-release or a time-release, such that the surrounding liquid can remain viscous for a suitable amount of time prior to breaking. The breaker can be any suitable breaker; for example, the breaker can be a compound that includes a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}$, $Mg^{2+}$, $Zn^{2+}$, and an $Al^{3+}$ salt of a chloride, fluoride, bromide, phosphate, or sulfate ion. In some examples, the breaker can be an oxidative breaker or an enzymatic breaker. An oxidative breaker can be at least one of a $Na^+$, $K^+$, $Li^+$, $Zn^+$, $NH_4^+$, $Fe^{2+}$, $Fe^{3+}$, $Cu^{1+}$, $Cu^{2+}$, $Ca^{2+}Mg^{2+}$, $Zn^{2+}$, and an $Al^{3+}$ salt of a persulfate, percarbonate, perborate, peroxide, perphosphosphate, permanganate, chlorite, or hyperchlorite ion. An enzymatic breaker can be at least one of an alpha or beta amylase, amyloglucosidase, oligoglucosidase, invertase, maltase, cellulase, hemi-cellulase, and mannanohydrolase. The breaker can be about 0.001 wt % to about 30 wt % of the composition, or about 0.01 wt % to about 5 wt %, or about 0.001 wt % or less, or about 0.005 wt %, 0.01, 0.05, 0.1, 0.5, 1, 2, 3, 4, 5, 6, 8, 10, 12, 14, 16, 18, 20, 22, 24, 26, 28, or about 30 wt % or more.

The composition, or a mixture including the composition, can include any suitable fluid. For example, the fluid can be at least one of dipropylene glycol methyl ether, dipropylene glycol dimethyl ether, dimethyl formamide, diethylene glycol methyl ether, ethylene glycol butyl ether, diethylene glycol butyl ether, propylene carbonate, D-limonene, a $C_2$-$C_{40}$ fatty acid $C_1$-$C_{10}$ alkyl ester, 2-butoxy ethanol, butyl acetate, furfuryl acetate, dimethyl sulfoxide, dimethyl formamide, diesel, kerosene, mineral oil, a hydrocarbon including an internal olefin, a hydrocarbon including an alpha olefin, xylenes, an ionic liquid, methyl ethyl ketone, and cyclohexanone. The fluid can form about 0.001 wt % to about 99.999 wt % of the composition or a mixture including the same, or about 0.001 wt % or less, 0.01 wt %, 0.1, 1, 2, 3, 4, 5, 6, 8, 10, 15, 20, 25, 30, 35, 40, 45, 50, 55, 60, 65, 70, 75, 80, 85, 90, 95, 96, 97, 98, 99, 99.9, 99.99, or about 99.999 wt % or more.

The composition including the compound comprising at least one silylating group and at least one ammonium group can include any suitable downhole fluid. The composition including the compound comprising at least one silylating group and at least one ammonium group can be combined with any suitable downhole fluid before, during, or after the placement of the composition in the subterranean formation or the contacting of the composition and the subterranean material. In some examples, the composition including the compound comprising at least one silylating group and at least one ammonium group is combined with a downhole fluid above the surface, and then the combined composition is placed in a subterranean formation or contacted with a subterranean material. In another example, the composition including the compound comprising at least one silylating group and at least one ammonium group is injected into a subterranean formation to combine with a downhole fluid, and the combined composition is contacted with a subterranean material or is considered to be placed in the subterranean formation. In various examples, at least one of prior to, during, and after the placement of the composition in the subterranean formation or contacting of the subterranean material and the composition, the composition is used in the subterranean formation (e.g., downhole), at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

In various embodiments, the composition including the compound comprising at least one silylating group and at least one ammonium group or a mixture including the same can include any suitable downhole fluid, such as an aqueous or oil-based fluid including a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof. The placement of the composition in the subterranean formation can include contacting the subterranean material and the mixture. Any suitable weight percent of the composition or of a mixture including the same that is placed in the subterranean formation or contacted with the subterranean material can be the downhole fluid, such as about 0.001 wt % to about 99.999 wt %, about 0.01 wt % to about 99.99 wt %, about 0.1 wt % to about 99.9 wt %, about 20 wt % to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture including the same.

In some embodiments, the composition or a mixture including the same can include any suitable amount of any suitable material used in a downhole fluid. For example, the composition can include water, saline, aqueous base, acid, oil, organic solvent, synthetic fluid oil phase, aqueous solution, alcohol or polyol, cellulose, starch, alkalinity control agents, acidity control agents, density control agents, density modifiers, emulsifiers, dispersants, polymeric stabilizers, crosslinking agents, polyacrylamide, a polymer or combination of polymers, antioxidants, heat stabilizers, foam control agents, solvents, diluents, plasticizer, filler or inorganic particle, pigment, dye, precipitating agent, rheology modifier, oil-wetting agents, set retarding additives, surfactants, gases, weight reducing additives, heavy-weight additives, lost circulation materials, filtration control additives, salts, fibers, thixotropic additives, breakers, crosslinkers, rheology modifiers, curing accelerators, curing retarders, pH modifiers, chelating agents, scale inhibitors, enzymes, resins, water control materials, oxidizers, markers, Portland cement, pozzolana cement, gypsum cement, high alumina content cement, slag cement, silica cement, fly ash, metakaolin, shale, zeolite, a crystalline silica compound, amorphous silica, hydratable clays, microspheres, pozzolan lime, or a combination thereof. In various embodiments, the composition can include one or more additive components such as: thinner additives such as COLDTROL®, ATC®, OMC 2™, and OMC 42™; RHEMOD™, a viscosifier and suspension agent including a modified fatty acid; additives for providing temporary increased viscosity, such as for shipping (e.g., transport to the well site) and for use in sweeps (for example, additives having the trade name TEMPERUS™ (a modified fatty acid) and VIS-PLUS®, a thixotropic viscosifying polymer blend); TAU-MOD™, a viscosifying/suspension agent including an amorphous/fibrous material; additives for filtration control, for example, ADAPTA®, a high temperature high pressure (HTHP) filtration control agent including a crosslinked copolymer; DURATONE® HT, a filtration control agent that includes an organophilic lignite, more particularly organophilic leonardite; THERMO TONE™, a HTHP filtration control agent including a synthetic polymer; BDF™-366, a HTHP filtration control agent; BDF™-454, a HTHP filtration control agent; LIQUITONE™, a polymeric filtration agent and viscosifier; additives for HTHP emulsion stability, for example, FACTANT™, which includes highly concentrated tall oil derivative; emulsifiers such as LE SUPERMUL™ and EZ MUL® NT, polyaminated fatty acid emulsifiers, and FORTI-MUL®; DRIL TREAT®, an oil wetting agent for heavy fluids; BARACARB®, a sized ground marble bridging agent; BAROID®, a ground barium sulfate weighting agent; BAROLIFT®, a hole sweeping agent; SWEEP-WATE®, a sweep weighting agent; BDF-508, a diamine dimer rheology modifier; GELTONE® II organophilic clay; BAROFIBRE™ O for lost circulation management and seepage loss prevention, including a natural cellulose fiber; STEELSEAL®, a resilient graphitic carbon lost circulation material; HYDRO-PLUG®, a hydratable swelling lost circulation material; lime, which can provide alkalinity and can activate certain emulsifiers; and calcium chloride, which can provide salinity. Any suitable proportion of the composition or mixture including the composition can include any optional component listed in this paragraph, such as about 0.001 wt % to about 99.999 wt %, about 0.01 wt % to about 99.99 wt %, about 0.1 wt % to about 99.9 wt %, about 20 to about 90 wt %, or about 0.001 wt % or less, or about 0.01 wt %, 0.1, 1, 2, 3, 4, 5, 10, 15, 20, 30, 40, 50, 60, 70, 80, 85, 90, 91, 92, 93, 94, 95, 96, 97, 98, 99, 99.9, 99.99 wt %, or about 99.999 wt % or more of the composition or mixture.

A drilling fluid, also known as a drilling mud or simply "mud," is a specially designed fluid that is circulated through a wellbore as the wellbore is being drilled to facilitate the drilling operation. The drilling fluid can be water-based or oil-based. The drilling fluid can carry cuttings up from beneath and around the bit, transport them up the annulus, and allow their separation. Also, a drilling fluid can cool and lubricate the drill head as well as reduce friction between the drill string and the sides of the hole. The drilling fluid aids in support of the drill pipe and drill head, and provides a hydrostatic head to maintain the integrity of the wellbore walls and prevent well blowouts. Specific drilling fluid systems can be selected to optimize a drilling operation in accordance with the characteristics of a particular geological formation. The drilling fluid can be formulated to prevent unwanted influxes of formation fluids from permeable rocks and also to form a thin, low permeability filter cake that temporarily seals pores, other openings, and formations penetrated by the bit. In water-based drilling fluids, solid particles are suspended in a water or brine solution containing other components. Oils or other non-aqueous liquids can be emulsified in the water or brine or at least partially solubilized (for less hydrophobic non-aqueous liquids), but water is the continuous phase. A drilling fluid can be present in the mixture with the composition including the compound comprising at least one silylating group and at least one ammonium group in any suitable amount, such as about 1 wt % or less, about 2 wt %, 3, 4, 5, 10, 15, 20, 30, 40, 50, 60, 70, 80, 85, 90, 95, 96, 97, 98, 99, 99.9, 99.99, or about 99.999 wt % or more of the mixture.

A water-based drilling fluid in embodiments of the present invention can be any suitable water-based drilling fluid. In various embodiments, the drilling fluid can include at least one of water (fresh or brine), a salt (e.g., calcium chloride, sodium chloride, potassium chloride, magnesium chloride, calcium bromide, sodium bromide, potassium bromide, calcium nitrate, sodium formate, potassium formate, cesium formate), aqueous base (e.g., sodium hydroxide or potassium hydroxide), alcohol or polyol, cellulose, starches, alkalinity control agents, density control agents such as a density modifier (e.g., barium sulfate), surfactants (e.g., betaines, alkali metal alkylene acetates, sultaines, ether carboxylates), emulsifiers, dispersants, polymeric stabilizers, crosslinking agents, polyacrylamides, polymers or combinations of polymers, antioxidants, heat stabilizers, foam control agents, solvents, diluents, plasticizers, filler or inorganic particles (e.g., silica), pigments, dyes, precipitating agents (e.g., silicates or aluminum complexes), and rheology modifiers such as thickeners or viscosifiers (e.g., xanthan gum). Any ingredient listed in this paragraph can be either present or not present in the mixture.

An oil-based drilling fluid or mud in embodiments of the present invention can be any suitable oil-based drilling fluid. In various embodiments the drilling fluid can include at least one of an oil-based fluid (or synthetic fluid), saline, aqueous solution, emulsifiers, other agents or additives for suspension control, weight or density control, oil-wetting agents, fluid loss or filtration control agents, and rheology control agents. For example, see H. C. H. Darley and George R. Gray, Composition and Properties of Drilling and Completion Fluids 66-67, 561-562 ($5^{th}$ ed. 1988). An oil-based or invert emulsion-based drilling fluid can include between about 10:90 to about 95:5, or about 50:50 to about 95:5, by volume of oil phase to water phase. A substantially all oil mud includes about 100% liquid phase oil by volume (e.g., substantially no internal aqueous phase).

A pill is a relatively small quantity (e.g., less than about 500 bbl, or less than about 200 bbl) of drilling fluid used to accomplish a specific task that the regular drilling fluid cannot perform. For example, a pill can be a high-viscosity pill to, for example, help lift cuttings out of a vertical wellbore. In another example, a pill can be a freshwater pill to, for example, dissolve a salt formation. Another example is a pipe-freeing pill to, for example, destroy filter cake and relieve differential sticking forces. In another example, a pill is a lost circulation material pill to, for example, plug a thief zone. A pill can include any component described herein as a component of a drilling fluid.

In various embodiments, the composition or mixture can include a proppant, a resin-coated proppant, an encapsulated resin, or a combination thereof. A proppant is a material that keeps an induced hydraulic fracture at least partially open during or after a fracturing treatment. Proppants can be transported into the subterranean formation (e.g., downhole) to the fracture using fluid, such as fracturing fluid or another fluid. A higher-viscosity fluid can more effectively transport proppants to a desired location in a fracture, especially larger proppants, by more effectively keeping proppants in a suspended state within the fluid. Examples of proppants can include sand, gravel, glass beads, polymer beads, ground products from shells and seeds such as walnut hulls, and manmade materials such as ceramic proppant, bauxite, tetrafluoroethylene materials (e.g., TEFLON™ available from DuPont), fruit pit materials, processed wood, composite particulates prepared from a binder and fine grade particulates such as silica, alumina, fumed silica, carbon black, graphite, mica, titanium dioxide, meta-silicate, calcium silicate, kaolin, talc, zirconia, boron, fly ash, hollow glass microspheres, and solid glass, or mixtures thereof. In some embodiments, the proppant can have an average particle size, wherein particle size is the largest dimension of a particle, of about 0.001 mm to about 3 mm, about 0.15 mm to about 2.5 mm, about 0.25 mm to about 0.43 mm, about 0.43 mm to about 0.85 mm, about 0.85 mm to about 1.18 mm, about 1.18 mm to about 1.70 mm, or about 1.70 to about 2.36 mm. In some embodiments, the proppant can have a distribution of particle sizes clustering around multiple averages, such as one, two, three, or four different average particle sizes. The composition or mixture can include any suitable amount of proppant, such as about 0.01 wt % to about 99.99 wt %, about 0.1 wt % to about 80 wt %, about 10 wt % to about 60 wt %, or about 0.01 wt % or less, or about 0.1 wt %, 1, 2, 3, 4, 5, 10, 15, 20, 30, 40, 50, 60, 70, 80, 85, 90, 91, 92, 93, 94, 95, 96, 97, 98, 99, about 99.9 wt %, or about 99.99 wt % or more.

The composition can include a payload material. The payload can be deposited in any suitable subterranean location. The method can include using the composition to deposit a payload material into a subterranean fracture. The subterranean fracture can be any suitable subterranean fracture. In some embodiments, the method includes forming the subterranean fracture; in other embodiments, the subterranean fracture is already formed. The payload material can be a proppant, or any other suitable payload material, such as a resin-coated proppant, a curable material, an encapsulated resin, a resin, a Portland cement, a pozzolana cement, a gypsum cement, a high alumina content cement, a slag cement, a silica cement, a cementitous kiln dust, fly ash, metakaolin, shale, zeolite, a set retarding additive, a corrosion inhibitor, a surfactant, a gas, an accelerator, a weight reducing additive, a heavy-weight additive, a lost circulation material, a filtration control additive, a dispersant, a crystalline silica compound, an amorphous silica, a salt, a fiber, a hydratable clay, a microsphere, pozzolan lime, a thixotropic additive, water, an aqueous base, an aqueous acid, an alcohol or polyol, a cellulose, a starch, an alkalinity control agent, an acidity control agent, a density control agent, a density modifier, an emulsifier, a polymeric stabilizer, a crosslinking agent, a polyacrylamide, a polymer or combination of polymers, an antioxidant, a heat stabilizer, a foam control agent, a solvent, a diluent, a plasticizer, a filler or inorganic particle, a pigment, a dye, a precipitating agent, a rheology modifier, or a combination thereof.

Drilling Assembly.

In various embodiments, the composition including the compound comprising at least one silylating group and at least one ammonium group disclosed herein can directly or indirectly affect one or more components or pieces of equipment associated with the preparation, delivery, recapture, recycling, reuse, and/or disposal of the composition. For example, and with reference to FIG. 1, the disclosed composition including the compound comprising at least one silylating group and at least one ammonium group can directly or indirectly affect one or more components or pieces of equipment associated with an exemplary wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 can include a drilling platform 102 that supports a derrick 104 having a traveling block 106 for raising and lowering a drill string 108. The drill string 108 can include drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a wellbore 116 that penetrates various subterranean formations 118.

A pump 120 (e.g., a mud pump) circulates drilling fluid 122 through a feed pipe 124 and to the kelly 110, which conveys the drilling fluid 122 downhole through the interior of the drill string 108 and through one or more orifices in the drill bit 114. The drilling fluid 122 is then circulated back to the surface via an annulus 126 defined between the drill string 108 and the walls of the wellbore 116. At the surface, the recirculated or spent drilling fluid 122 exits the annulus 126 and can be conveyed to one or more fluid processing unit(s) 128 via an interconnecting flow line 130. After passing through the fluid processing unit(s) 128, a "cleaned" drilling fluid 122 is deposited into a nearby retention pit 132 (e.g., a mud pit). While illustrated as being arranged at the outlet of the wellbore 116 via the annulus 126, those skilled in the art will readily appreciate that the fluid processing unit(s) 128 can be arranged at any other location in the drilling assembly 100 to facilitate its proper function, without departing from the scope of the disclosure.

The composition including the compound comprising at least one silylating group and at least one ammonium group can be added to the drilling fluid 122 via a mixing hopper 134 communicably coupled to or otherwise in fluid communication with the retention pit 132. The mixing hopper 134 can include mixers and related mixing equipment known to those skilled in the art. In other embodiments, however, the composition including the compound comprising at least one silylating group and at least one ammonium group can be added to the drilling fluid 122 at any other location in the drilling assembly 100. In at least one embodiment, for example, there could be more than one retention pit 132, such as multiple retention pits 132 in series. Moreover, the retention pit 132 can be representative of one or more fluid storage facilities and/or units where the composition including the compound comprising at least one silylating group and at least one ammonium group can be stored, reconditioned, and/or regulated until added to the drilling fluid 122.

As mentioned above, the composition including the compound comprising at least one silylating group and at least one ammonium group can directly or indirectly affect the components and equipment of the drilling assembly 100. For example, the composition including the compound comprising at least one silylating group and at least one ammonium group can directly or indirectly affect the fluid processing unit(s) 128, which can include one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, or any fluid reclamation equipment. The fluid processing unit(s) 128 can further include one or more sensors, gauges, pumps, compressors, and the like used to store, monitor, regulate, and/or recondition the composition including the compound comprising at least one silylating group and at least one ammonium group.

The composition including the compound comprising at least one silylating group and at least one ammonium group can directly or indirectly affect the pump 120, which representatively includes any conduits, pipelines, trucks, tubulars, and/or pipes used to fluidically convey the composition to the subterranean formation, any pumps, compressors, or motors (e.g., topside or downhole) used to drive the composition into motion, any valves or related joints used to regulate the pressure or flow rate of the composition, and any sensors (e.g., pressure, temperature, flow rate, and the like), gauges, and/or combinations thereof, and the like. The composition including the compound comprising at least one silylating group and at least one ammonium group can also directly or indirectly affect the mixing hopper 134 and the retention pit 132 and their assorted variations.

The composition including the compound comprising at least one silylating group and at least one ammonium group can also directly or indirectly affect the various downhole or subterranean equipment and tools that can come into contact with the composition such as the drill string 108, any floats, drill collars, mud motors, downhole motors, and/or pumps associated with the drill string 108, and any measurement while drilling (MWD)/logging while drilling (LWD) tools and related telemetry equipment, sensors, or distributed sensors associated with the drill string 108. The composition including the compound comprising at least one silylating group and at least one ammonium group can also directly or indirectly affect any downhole heat exchangers, valves and corresponding actuation devices, tool seals, packers and other wellbore isolation devices or components, and the like associated with the wellbore 116. The composition including the compound comprising at least one silylating group and at least one ammonium group can also directly or indirectly affect the drill bit 114, which can include roller cone bits, polycrystalline diamond compact (PDC) bits, natural diamond bits, any hole openers, reamers, coring bits, and the like.

While not specifically illustrated herein, the composition including the compound comprising at least one silylating group and at least one ammonium group can also directly or indirectly affect any transport or delivery equipment used to convey the composition to the drilling assembly 100 such as, for example, any transport vessels, conduits, pipelines, trucks, tubulars, and/or pipes used to fluidically move the composition including the compound comprising at least one silylating group and at least one ammonium group from one location to another, any pumps, compressors, or motors used to drive the composition into motion, any valves or related joints used to regulate the pressure or flow rate of the composition, and any sensors (e.g., pressure and temperature), gauges, and/or combinations thereof, and the like.

System or Apparatus.

In various embodiments, the present invention provides a system. The system can be any suitable system that can use or that can be generated by use of an embodiment of the composition described herein in a subterranean formation, or that can perform or be generated by performance of a method for using the composition described herein. The system can include a composition including a compound comprising at least one silylating group and at least one ammonium group. The system can also include a subterranean formation including the composition therein. In some embodiments, the composition in the system can also include a downhole fluid, or the system can include a mixture of the composition and downhole fluid. In some embodiments, the system can include a tubular, and a pump configured to pump the composition into the subterranean formation through the tubular.

Various embodiments provide systems and apparatus configured for delivering the composition described herein to a subterranean location and for using the composition therein, such as for a drilling operation, or a fracturing operation (e.g., pre-pad, pad, slurry, or finishing stages). In various embodiments, the system or apparatus can include a pump fluidly coupled to a tubular (e.g., any suitable type of oilfield pipe, such as pipeline, drill pipe, production tubing, and the like), the tubular containing a composition including the compound comprising at least one silylating group and at least one ammonium group described herein.

In some embodiments, the system can include a drillstring disposed in a wellbore, the drillstring including a drill bit at a downhole end of the drillstring. The system can also include an annulus between the drillstring and the wellbore. The system can also include a pump configured to circulate the composition through the drill string, through the drill bit, and back above-surface through the annulus. In some embodiments, the system can include a fluid processing unit configured to process the composition exiting the annulus to generate a cleaned drilling fluid for recirculation through the wellbore.

In various embodiments, the present invention provides an apparatus. The apparatus can be any suitable apparatus that can use or that can be generated by use of the method of treating a subterranean formation using the composition including the compound comprising at least one silylating group and at least one ammonium group described herein in a subterranean formation, or that can perform or be generated by performance of a method for using the composition described herein.

The pump can be a high pressure pump in some embodiments. As used herein, the term "high pressure pump" will refer to a pump that is capable of delivering a fluid to a subterranean formation (e.g., downhole) at a pressure of about 1000 psi or greater. A high pressure pump can be used when it is desired to introduce the composition to a subterranean formation at or above a fracture gradient of the subterranean formation, but it can also be used in cases where fracturing is not desired. In some embodiments, the high pressure pump can be capable of fluidly conveying particulate matter, such as proppant particulates, into the subterranean formation. Suitable high pressure pumps will be known to one having ordinary skill in the art and can include floating piston pumps and positive displacement pumps.

In other embodiments, the pump can be a low pressure pump. As used herein, the term "low pressure pump" will refer to a pump that operates at a pressure of about 1000 psi or less. In some embodiments, a low pressure pump can be fluidly coupled to a high pressure pump that is fluidly coupled to the tubular. That is, in such embodiments, the low pressure pump can be configured to convey the composition to the high pressure pump. In such embodiments, the low pressure pump can "step up" the pressure of the composition before it reaches the high pressure pump.

In some embodiments, the systems or apparatuses described herein can further include a mixing tank that is upstream of the pump and in which the composition is formulated. In various embodiments, the pump (e.g., a low pressure pump, a high pressure pump, or a combination thereof) can convey the composition from the mixing tank or other source of the composition to the tubular. In other embodiments, however, the composition can be formulated offsite and transported to a worksite, in which case the composition can be introduced to the tubular via the pump directly from its shipping container (e.g., a truck, a railcar, a barge, or the like) or from a transport pipeline. In either case, the composition can be drawn into the pump, elevated to an appropriate pressure, and then introduced into the tubular for delivery to the subterranean formation.

Figure 2:
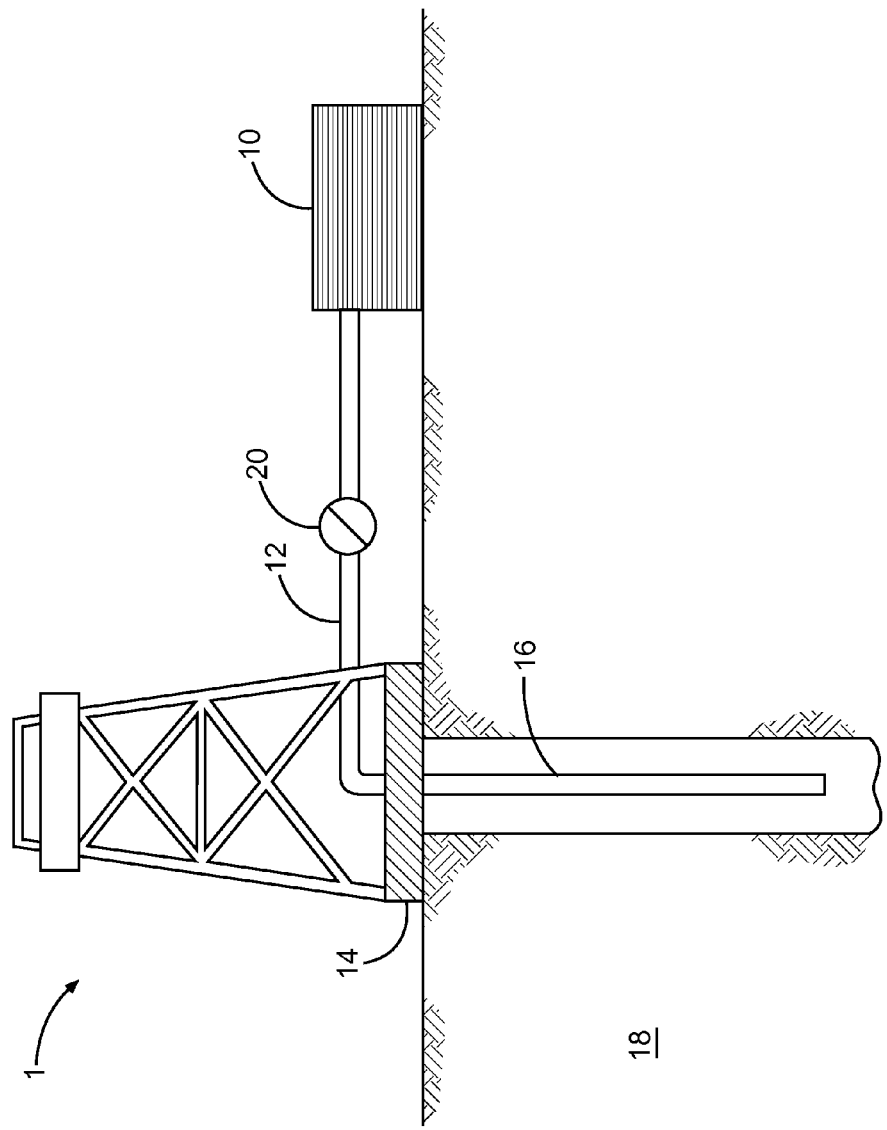
FIG. 2 illustrates a system or apparatus for delivering a composition to a subterranean formation, in accordance with various embodiments.

FIG. 2 shows an illustrative schematic of systems and apparatuses that can deliver embodiments of the compositions of the present invention to a subterranean location, according to one or more embodiments. It should be noted that while FIG. 2 generally depicts a land-based system or apparatus, it is to be recognized that like systems and apparatuses can be operated in subsea locations as well. Embodiments of the present invention can have a different scale than that depicted in FIG. 2. As depicted in FIG. 2, system or apparatus 1 can include mixing tank 10, in which an embodiment of the composition can be formulated. The composition can be conveyed via line 12 to wellhead 14, where the composition enters tubular 16, with tubular 16 extending from wellhead 14 into subterranean formation 18. Upon being ejected from tubular 16, the composition can subsequently penetrate into subterranean formation 18. Pump 20 can be configured to raise the pressure of the composition to a desired degree before its introduction into tubular 16. It is to be recognized that system or apparatus 1 is merely exemplary in nature and various additional components can be present that have not necessarily been depicted in FIG. 2 in the interest of clarity. In some examples, additional components that can be present include supply hoppers, valves, condensers, adapters, joints, gauges, sensors, compressors, pressure controllers, pressure sensors, flow rate controllers, flow rate sensors, temperature sensors, and the like.

Although not depicted in FIG. 2, at least part of the composition can, in some embodiments, flow back to wellhead 14 and exit subterranean formation 18. The composition that flows back can be substantially diminished in the concentration of the composition including the compound comprising at least one silylating group and at least one ammonium group therein. In some embodiments, the composition that has flowed back to wellhead 14 can subsequently be recovered, and in some examples reformulated, and recirculated to subterranean formation 18.

It is also to be recognized that the disclosed composition can also directly or indirectly affect the various downhole or subterranean equipment and tools that can come into contact with the composition during operation. Such equipment and tools can include wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, and the like), logging tools and related telemetry equipment, actuators (e.g., electromechanical devices, hydromechanical devices, and the like), sliding sleeves, production sleeves, plugs, screens, filters, flow control devices (e.g., inflow control devices, autonomous inflow control devices, outflow control devices, and the like), couplings (e.g., electro-hydraulic wet connect, dry connect, inductive coupler, and the like), control lines (e.g., electrical, fiber optic, hydraulic, and the like), surveillance lines, drill bits and reamers, sensors or distributed sensors, downhole heat exchangers, valves and corresponding actuation devices, tool seals, packers, cement plugs, bridge plugs, and other wellbore isolation devices or components, and the like. Any of these components can be included in the systems and apparatuses generally described above and depicted in FIG. 2.

Composition for Treatment of a Subterranean Formation.

Various embodiments provide a composition for treatment of a subterranean formation. The composition can be any suitable composition that can be used to perform an embodiment of the method for treatment of a subterranean formation described herein.

In some embodiments, the composition further includes at least one of a downhole fluid and a carrier fluid. The downhole fluid can be any suitable downhole fluid. In some embodiments, the downhole fluid is a composition for fracturing of a subterranean formation or subterranean material, or a fracturing fluid.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Additional Embodiments.

The following exemplary embodiments are provided, the numbering of which is not to be construed as designating levels of importance:

Embodiment 1 provides a method of treating a subterranean formation, the method comprising:
  obtaining or providing a composition comprising a compound comprising at least one silylating group and at least one ammonium group;
  placing the composition in a subterranean formation.

Embodiment 2 provides the method of Embodiment 1, wherein the ammonium group comprises an ion-exchange clay-stabilizing group.

Embodiment 3 provides the method of any one of Embodiments 1-2, wherein the method is a method of clay stabilization.

Embodiment 4 provides the method of any one of Embodiments 1-3, further comprising at least partially stabilizing clays against swelling via ion-exchange of the ammonium group with cations present in a clay in the subterranean formation.

Embodiment 5 provides the method of any one of Embodiments 1-4, wherein the silylating group comprises a tether group for a subterranean material comprising silylizable groups on a surface thereof.

Embodiment 6 provides the method of any one of Embodiments 1-5, wherein the silylating group comprises a hydroxy-reactive organosilicone group.

Embodiment 7 provides the method of Embodiment 6, wherein the organosilicone group comprises a tether group for a subterranean material comprising hydroxy-groups on a surface thereof.

Embodiment 8 provides the method of any one of Embodiments 1-7, wherein the method is a method of fines control.

Embodiment 9 provides the method of any one of Embodiments 1-8, further comprising tethering at least one of clays and fines in the subterranean formation via silylation of the clays or fines with the silylating group.

Embodiment 10 provides the method of any one of Embodiments 1-9, wherein the obtaining or providing of the composition occurs above-surface.

Embodiment 11 provides the method of any one of Embodiments 1-10, wherein the obtaining or providing of the composition occurs in the subterranean formation.

Embodiment 12 provides the method of any one of Embodiments 1-11, wherein about 0.000,1 wt % to about 100 wt % of the composition is the compound comprising at least one silylating group and at least one ammonium group.

Embodiment 13 provides the method of any one of Embodiments 1-12, wherein the composition further comprises a carrier fluid.

Embodiment 14 provides the method of Embodiment 13, wherein about 0.01 wt % to about 99.999 wt % of the composition is the carrier fluid.

Embodiment 15 provides the method of any one of Embodiments 1-14, wherein about 0.01 wt % to about 99.999 wt % of the composition comprises a downhole fluid.

Embodiment 16 provides the method of any one of Embodiments 1-15, further comprising combining the compound comprising at least one silylating group and at least one ammonium group with at least one of a carrier fluid and a downhole fluid at least one of prior to placing the composition in the subterranean formation and while the composition is in the subterranean formation.

Embodiment 17 provides the method of any one of Embodiments 1-16, wherein the compound comprising at least one silylating group and at least one ammonium group comprises the structure:

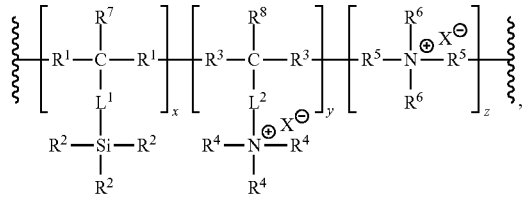

wherein
at each occurrence, each group having degree of polymerization x, y, and z is independently in a block or random arrangement and is independently oriented as shown or in the opposite orientation;
at each occurrence, $R^1$, $R^3$, and $R^5$ are each independently selected from the group consisting of a bond, —O—, —$NR^7$—, —$N^+(R^7)_2X^-$—, —S—, and a substituted or unsubstituted ($C_1$-$C_{20}$)hydrocarbylene at least one of interrupted and terminated with 0, 1, 2, or 3 groups independently selected from —O—, —$NR^7$—, —$N^+(R^7)_2X^-$—, and —S—;
at each occurrence, $R^2$ is independently selected from the group consisting of —OH, substituted or unsubstituted ($C_1$-$C_{20}$)hydrocarbyl, substituted or unsubstituted ($C_1$-$C_{20}$)hydrocarbyloxy, -$L^1$-$SiR^2_3$, -$L^2$-$N^+R^4_3X^-$, and an inter- or intra-molecular crosslink to an Si atom;
at each occurrence, $R^4$ and $R^6$ are each independently selected from the group consisting of —H, substituted or unsubstituted ($C_1$-$C_{20}$)hydrocarbyl, -$L^1$-$SiR^2_3$, and -$L^2$-$N^+R^4_3X^-$;

at each occurrence, $R^7$ and $R^8$ are each independently selected from the group consisting of —H, —OH, substituted or unsubstituted ($C_1$-$C_{20}$)hydrocarbyl, substituted or unsubstituted ($C_1$-$C_{20}$)hydrocarbyloxy, -$L^1$-$SiR^2_3$, and -$L^2$-$N^+R^4_3X^-$;
at each occurrence, $L^1$ and $L^2$ are each independently selected from the group consisting of a bond, a poly(substituted or unsubstituted ($C_1$-$C_{20}$)hydrocarbyloxy), a poly(substituted or unsubstituted ($C_1$-$C_{20}$) hydrocarbylamino), and a substituted or unsubstituted ($C_1$-$C_{20}$)hydrocarbyl at least one of interrupted and terminated with 0, 1, 2, or 3 groups independently selected from —O—, —$NR^7$—, —$N^+(R^7)_2X^-$—, and —S—, wherein each amino group is independently substituted or unsubstituted and is independently neutral or ammonium;
$X^-$ is a counterion; and
$x+y+z$ is greater than 0.

Embodiment 18 provides the method of Embodiment 17, wherein the compound comprising at least one silylating group and at least one ammonium group comprises the structure:

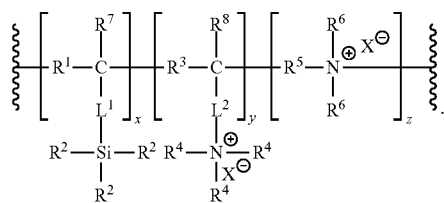

Embodiment 19 provides the method of any one of Embodiments 17-18, wherein the compound comprising at least one silylating group and at least one ammonium group has the structure

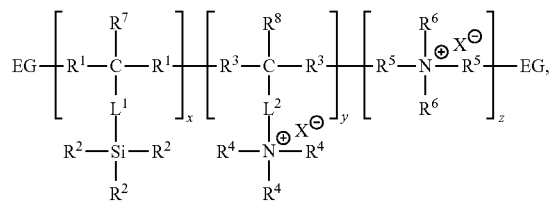

wherein at each occurrence, EG is independently selected from the group consisting of —H, -$L^1$-$SiR^2_3$, and -$L^2$-$N^+R^4_3X^-$, a poly(substituted or unsubstituted ($C_1$-$C_{20}$)hydrocarbyloxy), a poly(substituted or unsubstituted ($C_1$-$C_{20}$)hydrocarbylamino), and a substituted or unsubstituted ($C_1$-$C_{20}$)hydrocarbyl at least one of interrupted and terminated with 0, 1, 2, or 3 groups independently selected from —O—, —$NR^7$—, —$N^+(R^7)_2X^-$—, and —S—, wherein each amino group is independently substituted or unsubstituted and is independently neutral or ammonium.

Embodiment 20 provides the method of Embodiment 19, wherein at each occurrence, EG is independently selected from the group consisting of —H, substituted or unsubstituted ($C_1$-$C_{10}$)alkyl, and substituted or unsubstituted ($C_6$-$C_{20}$)aryl.

Embodiment 21 provides the method of any one of Embodiments 19-20, wherein at each occurrence, EG is —H.

Embodiment 22 provides the method of any one of Embodiments 17-21, wherein at each occurrence, $R^1$, $R^3$, and $R^5$ are each independently selected from the group consisting of a bond, —O—, a $(C_1\text{-}C_{20})$hydrocarbylene substituted with 0, 1, 2, or 3 hydroxy-groups, and a $(C_1\text{-}C_{20})$hydrocarbyloxy substituted with 0, 1, 2, or 3 hydroxy-groups.

Embodiment 23 provides the method of any one of Embodiments 17-22, wherein at each occurrence, $R^1$, $R^3$, and $R^5$ are each independently selected from the group consisting of a bond, —O—, a $(C_1\text{-}C_{10})$alkyl substituted with 0, 1, 2, or 3 hydroxy-groups, and a $(C_1\text{-}C_{10})$alkoxy substituted with 0, 1, 2, or 3 hydroxy-groups.

Embodiment 24 provides the method of any one of Embodiments 17-23, wherein at each occurrence, $R^1$, $R^3$, and $R^5$ are each independently selected from the group consisting of a bond, —O—, —CH$_2$—O—, —CH(OH)—CH$_2$—O—, and $(C_1\text{-}C_{10})$alkyl.

Embodiment 25 provides the method of any one of Embodiments 17-24, wherein at each occurrence, $R^2$ is independently selected from the group consisting of $(C_1\text{-}C_{20})$hydrocarbyl substituted with 0, 1, 2, or 3 hydroxy-groups and $(C_1\text{-}C_{20})$hydrocarbyloxy substituted with 0, 1, 2, or 3 hydroxy-groups.

Embodiment 26 provides the method of any one of Embodiments 17-25, wherein at each occurrence, $R^2$ is independently selected from $(C_1\text{-}C_{10})$alkoxy substituted with 0, 1, 2, or 3 hydroxy-groups.

Embodiment 27 provides the method of any one of Embodiments 17-26, wherein at each occurrence, $R^2$ is independently selected from the group consisting of —CH$_3$, —OCH$_3$, —CH$_2$CH$_3$, —OCH$_2$CH$_3$, —CH$_2$CH$_3$—OH, —OCH$_2$CH$_3$—OH, and cyclohexyl.

Embodiment 28 provides the method of any one of Embodiments 17-27, wherein at each occurrence, $R^4$ and $R^6$ are each independently selected from the group consisting of —H and $(C_1\text{-}C_{20})$hydrocarbyl substituted with 0, 1, 2, or 3 hydroxy-groups.

Embodiment 29 provides the method of any one of Embodiments 17-28, wherein at each occurrence, $R^4$ and $R^6$ are each independently selected from the group consisting of —H, $(C_1\text{-}C_{10})$alkyl substituted with 0, 1, 2, or 3 hydroxy-groups, and substituted or unsubstituted $(C_6\text{-}C_{20})$aryl.

Embodiment 30 provides the method of any one of Embodiments 17-29, wherein at each occurrence, $R^4$ and $R^6$ are each independently selected from the group consisting of —H, $(C_1\text{-}C_{10})$alkyl, —CH$_3$, —CH$_2$CH$_3$, —CH$_2$CH$_3$—OH, cyclohexyl, and phenyl.

Embodiment 31 provides the method of any one of Embodiments 17-30, wherein at each occurrence, $R^7$ and $R^8$ are each independently selected from the group consisting of —H, —OH, and $(C_1\text{-}C_{10})$alkoxy, and $(C_1\text{-}C_{10})$alkyl.

Embodiment 32 provides the method of any one of Embodiments 17-31, wherein at each occurrence, $R^7$ and $R^8$ are each independently selected from the group consisting of —H, —OH, and $(C_1\text{-}C_5)$alkyl.

Embodiment 33 provides the method of any one of Embodiments 17-32, wherein at each occurrence, $R^7$ and $R^8$ are each —H.

Embodiment 34 provides the method of any one of Embodiments 17-33, wherein at each occurrence, $L^1$ and $L^2$ are each independently selected from the group consisting of a bond, a poly(($C_1\text{-}C_{20}$)hydrocarbyloxy), a poly(($C_1\text{-}C_{20}$)hydrocarbylamino), and a $(C_1\text{-}C_{20})$hydrocarbyl.

Embodiment 35 provides the method of any one of Embodiments 17-34, wherein at each occurrence, $L^1$ and $L^2$ are each independently selected from the group consisting of a bond, a poly(substituted or unsubstituted $(C_2\text{-}C_{10})$alkyloxy), a poly(($C_2\text{-}C_{20}$)alkylamino), and a $(C_1\text{-}C_{10})$alkyl substituted with 0, 1, 2, or 3 hydroxy-groups.

Embodiment 36 provides the method of any one of Embodiments 17-35, wherein at each occurrence, $L^1$ and $L^2$ are each independently selected from the group consisting of a bond and a $(C_1\text{-}C_{10})$alkyl.

Embodiment 37 provides the method of any one of Embodiments 17-36, wherein at each occurrence, $L^1$ and $L^2$ are each independently selected from the group consisting of a bond, methylene, ethylene, propylene, and butylene.

Embodiment 38 provides the method of any one of Embodiments 17-37, wherein at each occurrence $X^-$ is independently selected from fluoro, chloro, iodo, bromo, nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate, acetate, formate, oxide, sulfide, nitride, arsenate, phosphate, arsenite, hydrogen phosphate, sulfate, thiosulfate, sulfite, carbonate, chromate, dichromate, peroxide, tetrafluoroborate, hexafluorophosphate, or oxalate.

Embodiment 39 provides the method of any one of Embodiments 17-38, wherein the compound comprising at least one silylating group and at least one ammonium group has a molecular weight of about 200 g/mol to about 50,000,000 g/mol.

Embodiment 40 provides the method of any one of Embodiments 17-39, wherein x is about 0 to about 500,000.

Embodiment 41 provides the method of any one of Embodiments 17-40, wherein y is about 0 to about 500,000.

Embodiment 42 provides the method of any one of Embodiments 17-41, wherein z is about 0 to about 500,000.

Embodiment 43 provides the method of any one of Embodiments 17-42, wherein the compound comprising at least one silylating group and at least one ammonium group has the structure:

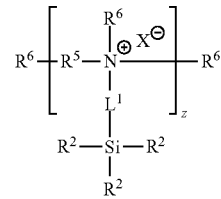

wherein
at each occurrence, $R^5$ is independently selected from the group consisting of a bond and $(C_1\text{-}C_{10})$alkyl;
at each occurrence, $R^6$ is independently selected from the group consisting of —H, substituted or unsubstituted $(C_1\text{-}C_{10})$alkyl, and substituted or unsubstituted $(C_6\text{-}C_{20})$aryl;

at each occurrence, $L^1$ and $L^2$ are each independently selected from the group consisting of a bond and a $(C_1\text{-}C_{10})$alkyl; and at each occurrence, $R^2$ is independently selected from $(C_1\text{-}C_{10})$alkoxy.

Embodiment 44 provides the method of Embodiment 43, wherein $L^1$ and $L^2$ are each propyl;

$R^2$ is —$OCH_3$;

$R^5$ is a bond or ethylene; and z is about 2 to about 100,000

Embodiment 45 provides the method of any one of Embodiments 1-44, wherein the compound comprising at least one silylating group and at least one ammonium group has the structure:

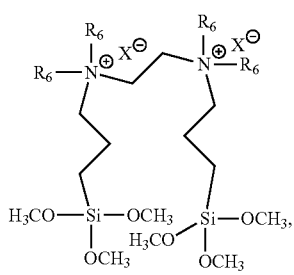

wherein at each occurrence, $R^6$ is independently selected from the group consisting of —H, substituted or unsubstituted $(C_1\text{-}C_{10})$alkyl, and substituted or unsubstituted $(C_6\text{-}C_{20})$aryl.

Embodiment 46 provides the method of any one of Embodiments 17-45, wherein the compound comprising at least one silylating group and at least one ammonium group comprises the structure:

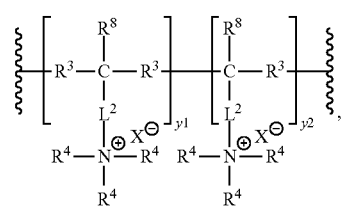

wherein the groups having degree of polymerization y1 and y2 are in a block or random arrangement, and y1+y2=y.

Embodiment 47 provides the method of any one of Embodiments 17-46, wherein the compound comprising at least one silylating group and at least one ammonium group comprises the structure:

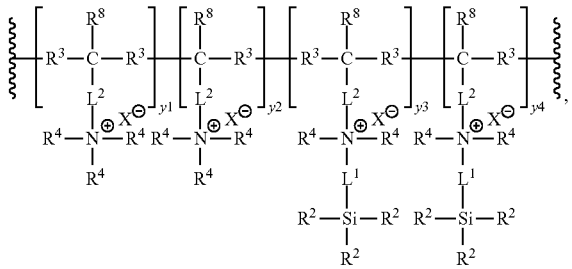

wherein the groups having degree of polymerization y1, y2, y3, and y4 are in a block or random arrangement, y1+y2+y3+y4=y, y1+y2 is greater than 0, and y3+y4 is greater than 0.

Embodiment 48 provides the method of Embodiment 47, wherein the compound comprising at least one silylating group and at least one ammonium group comprises the structure:

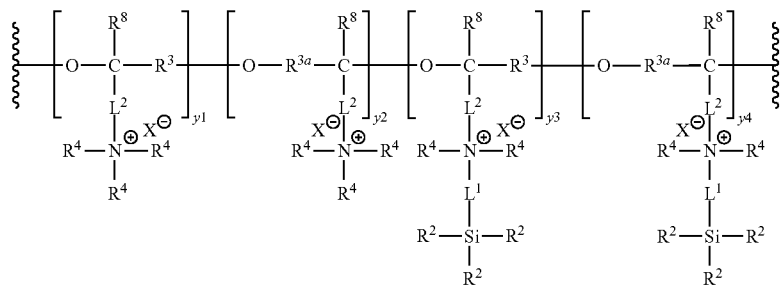

wherein at each occurrence, $R^2$ is independently selected from $(C_1\text{-}C_5)$alkoxy;

at each occurrence, $R^{3a}$ is independently selected from $(C_1\text{-}C_5)$alkylene;

at each occurrence, $R^4$ is independently selected from $(C_1\text{-}C_5)$alkyl;

at each occurrence, $R^8$ is independently selected from —H and $(C_1\text{-}C_5)$alkyl;

at each occurrence, $L^2$ is independently selected from $(C_1\text{-}C_5)$alkylene.

Embodiment 49 provides the method of any one of Embodiments 47-48, wherein the compound comprising at least one silylating group and at least one ammonium group comprises the structure:

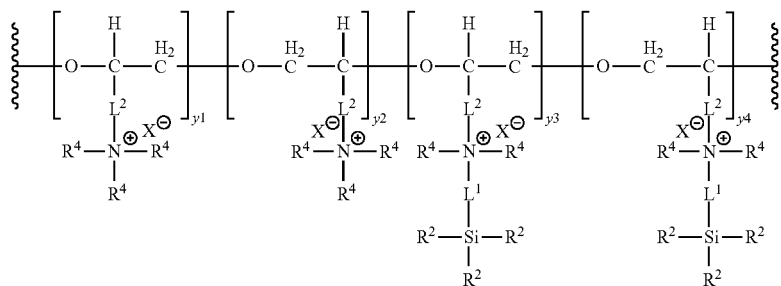

wherein
at each occurrence, $R^2$ is independently selected from $(C_1-C_5)$alkoxy;
at each occurrence, $R^4$ is independently selected from $(C_1-C_5)$alkyl;
at each occurrence, $L^2$ is independently selected from $(C_1-C_5)$alkylene.

Embodiment 50 provides the method of any one of Embodiments 47-49, wherein the compound comprising at least one silylating group and at least one ammonium group has the structure:

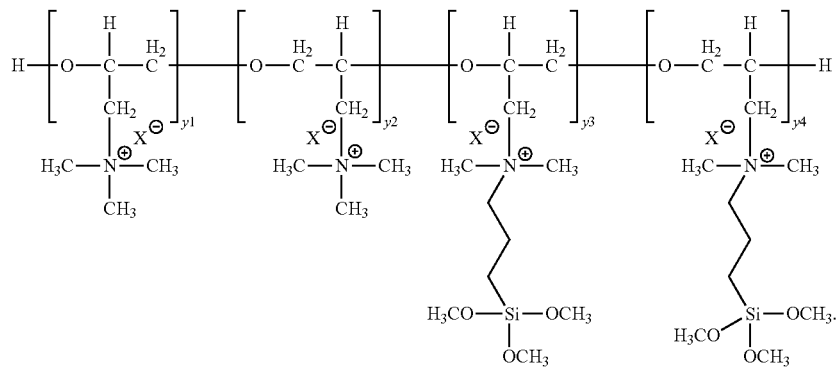

Embodiment 51 provides the method of any one of Embodiments 1-50, further comprising combining the composition with an aqueous or oil-based fluid comprising a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof, to form a mixture, wherein the placing the composition in the subterranean formation comprises placing the mixture in the subterranean formation.

Embodiment 52 provides the method of any one of Embodiments 1-51, wherein at least one of prior to, during, and after the placing of the composition in the subterranean formation, the composition is used in the subterranean formation, at least one of alone and in combination with other materials, as a drilling fluid, stimulation fluid, fracturing fluid, spotting fluid, clean-up fluid, completion fluid, remedial treatment fluid, abandonment fluid, pill, acidizing fluid, cementing fluid, packer fluid, or a combination thereof.

Embodiment 53 provides the method of any one of Embodiments 1-52, wherein the composition further comprises water, saline, aqueous base, oil, organic solvent, synthetic fluid oil phase, aqueous solution, alcohol or polyol, cellulose, starch, alkalinity control agent, acidity control agent, density control agent, density modifier, emulsifier, dispersant, polymeric stabilizer, crosslinking agent, polyacrylamide, polymer or combination of polymers, antioxidant, heat stabilizer, foam control agent, solvent, diluent, plasticizer, filler or inorganic particle, pigment, dye, precipitating agent, rheology modifier, oil-wetting agent, set retarding additive, surfactant, corrosion inhibitor, gas, weight reducing additive, heavy-weight additive, lost circulation material, filtration control additive, salt, fiber, thixotropic additive, breaker, crosslinker, gas, rheology modifier, curing accelerator, curing retarder, pH modifier, chelating agent, scale inhibitor, enzyme, resin, water control material, polymer, oxidizer, a marker, Portland cement, pozzolana cement, gypsum cement, high alumina content cement, slag cement, silica cement, fly ash, metakaolin, shale, zeolite, a crystalline silica compound, amorphous silica, fibers, a hydratable clay, microspheres, pozzolan lime, or a combination thereof.

Embodiment 54 provides the method of any one of Embodiments 1-53, wherein the placing of the composition in the subterranean formation comprises fracturing at least part of the subterranean formation to form at least one subterranean fracture.

Embodiment 55 provides the method of any one of Embodiments 1-54, wherein the composition further comprises a proppant, a resin-coated proppant, or a combination thereof.

Embodiment 56 provides the method of any one of Embodiments 1-55, wherein the placing of the composition in the subterranean formation in the subterranean formation comprises pumping the composition through a drill string disposed in a wellbore, through a drill bit at a downhole end of the drill string, and back above-surface through an annulus.

Embodiment 57 provides the method of Embodiment 56, further comprising processing the composition exiting the annulus with at least one fluid processing unit to generate a cleaned composition and recirculating the cleaned composition through the wellbore.

Embodiment 58 provides a system for performing the method of any one of Embodiments 1-57, the system comprising:
a tubular disposed in the subterranean formation;
a pump configured to pump the composition in the subterranean formation through the tubular.

Embodiment 59 provides a system for performing the method of any one of Embodiments 1-58, the system comprising:
a drillstring disposed in a wellbore, the drillstring comprising a drill bit at a downhole end of the drillstring;
an annulus between the drillstring and the wellbore; and
a pump configured to circulate the composition through the drill string, through the drill bit, and back above-surface through the annulus.

Embodiment 60 provides a method of treating a subterranean formation, the method comprising:
obtaining or providing a composition comprising a compound comprising at least one silylating group and at least one ammonium group, the compound comprising the structure:

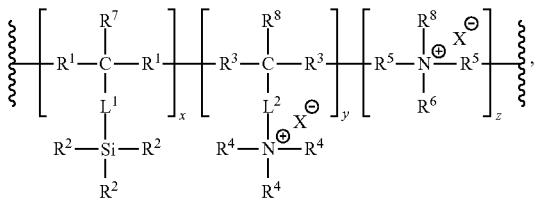

wherein
at each occurrence, each group having degree of polymerization x, y, and z is independently in a block or random arrangement and is independently oriented as shown or in the opposite orientation;
at each occurrence, $R^1$, $R^3$, and $R^5$ are each independently selected from the group consisting of a bond, —O—, —NR$^7$—, —N$^+$(R$^7$)$_2$X$^-$—, —S—, and a substituted or unsubstituted (C$_1$-C$_{20}$)hydrocarbylene at least one of interrupted and terminated with 0, 1, 2, or 3 groups independently selected from —O—, —NR$^7$—, —N$^+$(R$^7$)$_2$X$^-$—, and —S—;
at each occurrence, $R^2$ is independently selected from the group consisting of —OH, substituted or unsubstituted (C$_1$-C$_{20}$)hydrocarbyl, substituted or unsubstituted (C$_1$-C$_{20}$)hydrocarbyloxy, -L$^1$-SiR$^2{}_3$, -L$^2$-N$^+$R$^4{}_3$X$^-$, and an inter- or intra-molecular crosslink to an Si atom;

at each occurrence, $R^4$ and $R^6$ are each independently selected from the group consisting of —H, substituted or unsubstituted (C$_1$-C$_{20}$)hydrocarbyl, -L$^1$-SiR$^2{}_3$, and -L$^2$-N$^+$R$^4{}_3$X$^-$;
at each occurrence, $R^7$ and $R^8$ are each independently selected from the group consisting of —H, —OH, substituted or unsubstituted (C$_1$-C$_{20}$)hydrocarbyl, substituted or unsubstituted (C$_1$-C$_{20}$)hydrocarbyloxy, -L$^1$-SiR$^2{}_3$, and -L$^2$-N$^+$R$^4{}_3$X$^-$;
at each occurrence, $L^1$ and $L^2$ are each independently selected from the group consisting of a bond, a poly(substituted or unsubstituted (C$_1$-C$_{20}$)hydrocarbyloxy), a poly(substituted or unsubstituted (C$_1$-C$_{20}$) hydrocarbylamino), and a substituted or unsubstituted (C$_1$-C$_{20}$)hydrocarbyl at least one of interrupted and terminated with 0, 1, 2, or 3 groups independently selected from —O—, —NR$^7$—, —N$^+$(R$^7$)$_2$X$^-$—, and —S—, wherein each amino group is independently substituted or unsubstituted and is independently neutral or ammonium;
X$^-$ is a counterion; and
x+y+z is greater than 0; and
placing the composition in a subterranean formation.

Embodiment 61 provides a system comprising:
a composition comprising a compound comprising at least one silylating group and at least one ammonium group; and
a subterranean formation comprising the composition therein.

Embodiment 62 provides the system of Embodiment 61, further comprising
a drillstring disposed in a wellbore, the drillstring comprising a drill bit at a downhole end of the drillstring;
an annulus between the drillstring and the wellbore; and
a pump configured to circulate the composition through the drill string, through the drill bit, and back above-surface through the annulus.

Embodiment 63 provides the system of Embodiment 62, further comprising a fluid processing unit configured to process the composition exiting the annulus to generate a cleaned drilling fluid for recirculation through the wellbore.

Embodiment 64 provides the system of any one of Embodiments 61-63, further comprising
a tubular disposed in the subterranean formation;
a pump configured to pump the composition in the subterranean formation through the tubular.

Embodiment 65 provides a composition for treatment of a subterranean formation, the composition comprising:
a compound comprising at least one silylating group and at least one ammonium group; and
at least one of a downhole fluid and a carrier fluid.

Embodiment 66 provides a composition for treatment of a subterranean formation, the composition comprising:
a compound comprising at least one silylating group and at least one ammonium group, the compound comprising the structure:

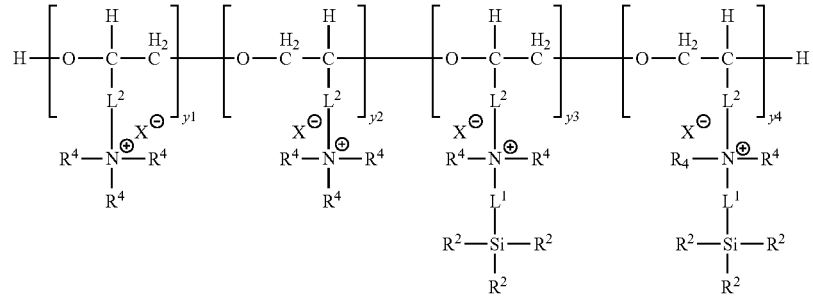

wherein
at each occurrence, each group having degree of polymerization y1, y2, y3, and y4 is independently in a block or random arrangement and is independently oriented as shown or in the opposite orientation
at each occurrence, $R^2$ is independently selected from $(C_1$-$C_5)$alkoxy;
at each occurrence, $R^4$ is independently selected from $(C_1$-$C_5)$alkyl;
at each occurrence, $L^2$ is independently selected from $(C_1$-$C_5)$alkylene; and
y1+y2 is greater than 0, and y3+y4 is greater than 0; and
at least one of a downhole fluid and a carrier fluid.

Embodiment 67 provides a composition for treatment of a subterranean formation, the composition comprising:
a compound comprising at least one silylating group and at least one ammonium group, the compound having the structure:

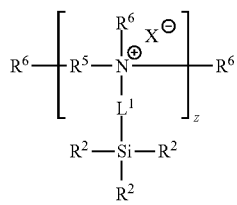

wherein
at each occurrence, $R^5$ is independently selected from the group consisting of a bond and $(C_1$-$C_{10})$alkyl;
at each occurrence, $R^6$ is independently selected from the group consisting of —H, substituted or unsubstituted $(C_1$-$C_{10})$alkyl, and substituted or unsubstituted $(C_6$-$C_{20})$aryl;
at each occurrence, $L^1$ and $L^2$ are each independently selected from the group consisting of a bond and a $(C_1$-$C_{10})$alkyl; and
at each occurrence, $R^2$ is independently selected from $(C_1$-$C_{10})$alkoxy.

Embodiment 68 provides the composition, method, or system of any one or any combination of Embodiments 1-67 optionally configured such that all elements or options recited are available to use or select from.

What is claimed is:
1. A method of treating a subterranean formation, comprising:
placing a composition comprising a compound into the subterranean formation, the compound comprising at least one silylating group and at least one ammonium group,
wherein:
the silylating group comprises a hydroxyl-reactive organosilicone group; and
the ammonium group comprises an ion-exchange clay-stabilizing group; and
hydraulically fracturing the subterranean formation with the composition to generate flow pathway in the subterranean formation.

2. The method of claim 1, further comprising at least partially stabilizing clays against swelling via ion-exchange of the ammonium group with cations present in a clay in the subterranean formation.

3. The method of claim 1, wherein the silylating group comprises a tether group for a subterranean material comprising silylizable groups on a surface thereof.

4. The method of claim 1, further comprising tethering at least one of clays and fines in the subterranean formation via silylation of the clays or fines with the silylating group.

5. The method of claim 1, wherein the compound comprising at least one silylating group and at least one ammonium group comprises the structure:

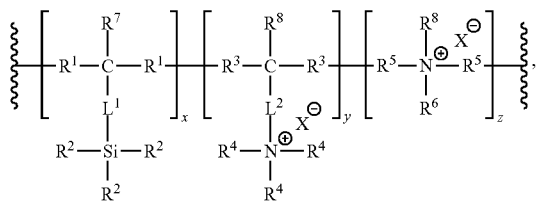

wherein:
at each occurrence, each group having degree of polymerization x, y, and z is independently in a block or random arrangement and is independently oriented as shown or in the opposite orientation;
at each occurrence, $R^1$, $R^3$, and $R^5$ are each independently selected from the group consisting of a bond, —O—, —$NR^7$—, —$N^+(R^7)_2X^-$—, —S—, and a substituted or unsubstituted $(C_1$-$C_{20})$hydrocarbylene at least one of interrupted and terminated with 0, 1, 2, or 3 groups independently selected from —O—, —$NR^7$—, —$N^+(R^7)_2X^-$—, and —S—;
at each occurrence, $R^2$ is independently selected from the group consisting of —OH, substituted or unsubstituted $(C_1$-$C_{20})$hydrocarbyl, substituted or unsubstituted $(C_1$-$C_{20})$hydrocarbyloxy, -$L^1$-$SiR^2_3$, -$L^2$-$N^+R^4_3X^-$, and an inter- or intra-molecular crosslink to an Si atom;
at each occurrence, $R^4$ and $R^6$ are each independently selected from the group consisting of —H, substituted or unsubstituted $(C_1$-$C_{20})$hydrocarbyl, -$L^1$-$SiR^2_3$, and -$L^2$-$N^+R^4_3X^-$;
at each occurrence, $R^7$ and $R^8$ are each independently selected from the group consisting of —H, —OH, substituted or unsubstituted $(C_1$-$C_{20})$hydrocarbyl, substituted or unsubstituted $(C_1$-$C_{20})$hydrocarbyloxy, -$L^1$-$SiR^2_3$, and -$L^2$-$N^+R^4_3X^-$;
at each occurrence, $L^1$ and $L^2$ are each independently selected from the group consisting of a bond, a poly(substituted or unsubstituted $(C_1$-$C_{20})$hydrocarbyloxy), a poly(substituted or unsubstituted $(C_1$-$C_{20})$hydrocarbylamino), and a substituted or unsubstituted $(C_1$-$C_{20})$hydrocarbyl at least one of interrupted and terminated with 0, 1, 2, or 3 groups independently selected from —O—, —$NR^7$—, —$N^-(R^7)_2X^-$—, and —S—, wherein each amino group is independently substituted or unsubstituted and is independently neutral or ammonium;
$X^-$ is a counterion; and
x+y+z is greater than 0.

6. The method of claim 5, wherein the compound comprising at least one silylating group and at least one ammonium group comprises the structure:

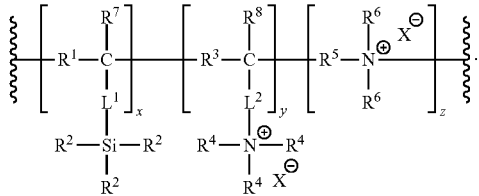

7. The method of claim 5, wherein the compound comprising at least one silylating group and at least one ammonium group has the structure:

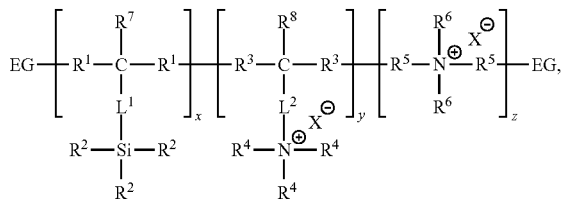

wherein at each occurrence, EG is independently selected from the group consisting of —H, -L$^1$-SiR$^2{}_3$, and -L$^2$-N$^+$R$^4{}_3$X$^-$, a poly(substituted or unsubstituted (C$_1$-C$_{20}$)hydrocarbyloxy), a poly(substituted or unsubstituted (C$_1$-C$_{20}$)hydrocarbylamino), and a substituted or unsubstituted (C$_1$-C$_{20}$)hydrocarbyl at least one of interrupted and terminated with 0, 1, 2, or 3 groups independently selected from —O—, —NR$^7$—, —N$^-$(R$^7$)$_2$X$^-$—, and —S—, wherein each amino group is independently substituted or unsubstituted and is independently neutral or ammonium.

8. The method of claim 5, wherein the compound comprising at least one silylating group and at least one ammonium group has the structure:

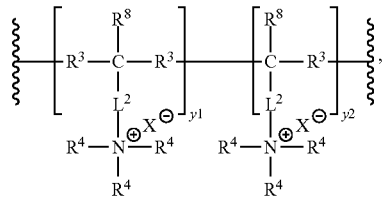

wherein:
at each occurrence, R$^5$ is independently selected from the group consisting of a bond and (C$_1$-C$_{10}$)alkyl;
at each occurrence, R$^6$ is independently selected from the group consisting of —H, substituted or unsubstituted (C$_1$-C$_{10}$)alkyl, and substituted or unsubstituted (C$_6$-C$_{20}$)aryl;
at each occurrence, L$^1$ and L$^2$ are each independently selected from the group consisting of a bond and a (C$_1$-C$_{10}$)alkyl; and
at each occurrence, R$^2$ is independently selected from (C$_1$-C$_{10}$)alkoxy.

9. The method of claim 5, wherein the compound comprising at least one silylating group and at least one ammonium group comprises the structure:

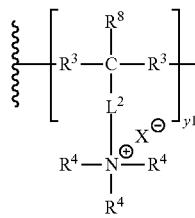

wherein the groups having degree of polymerization y1 and y2 are in a block or random arrangement, and y1+y2=y.

10. The method of claim 5, wherein the compound comprising at least one silylating group and at least one ammonium group comprises the structure:

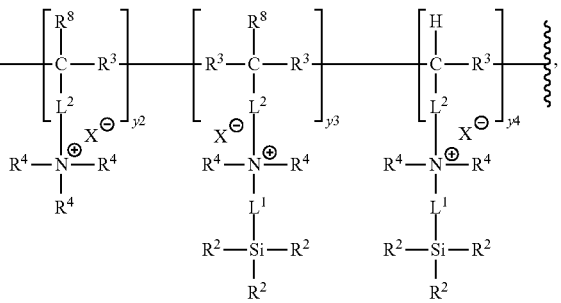

wherein the groups having degree of polymerization y1, y2, y3, and y4 are in a block or random arrangement, y1+y2+y3+y4=y, y1+y2 is greater than 0, and y3+y4 is greater than 0.

11. The method of claim 10, wherein the compound comprising at least one silylating group and at least one ammonium group comprises the structure:

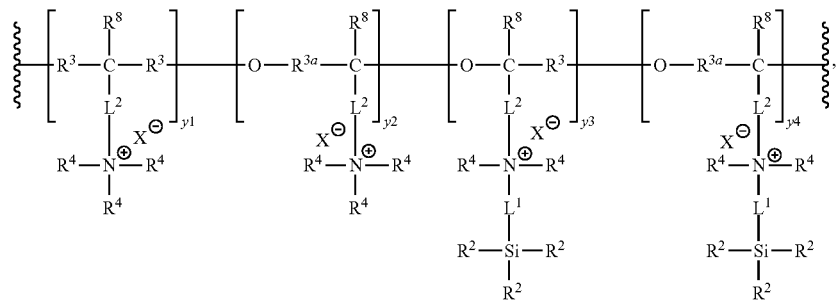

wherein:
at each occurrence, $R^2$ is independently selected from $(C_1-C_5)$alkoxy;
at each occurrence, $R^{3a}$ is independently selected from $(C_1-C_5)$alkylene;
at each occurrence, $R^4$ is independently selected from $(C_1-C_5)$alkyl;
at each occurrence, $R^8$ is independently selected from —H and $(C_1-C_5)$alkyl; and
at each occurrence, $L^2$ is independently selected from $(C_1-C_5)$alkylene.

12. The method of claim 10, wherein the compound comprising at least one silylating group and at least one ammonium group comprises the structure:

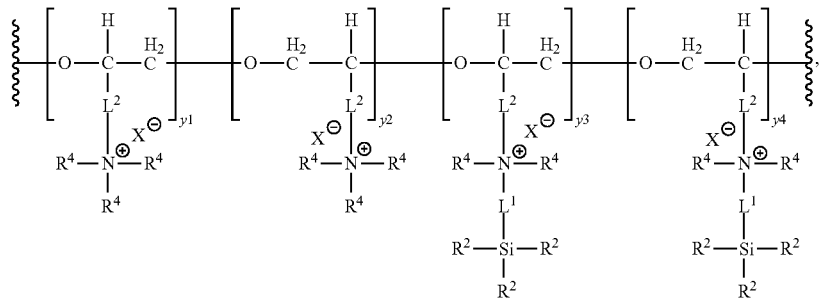

wherein:
at each occurrence, $R^2$ is independently selected from $(C_1-C_5)$alkoxy;
at each occurrence, $R^4$ is independently selected from $(C_1-C_5)$alkyl; and
at each occurrence, $L^2$ is independently selected from $(C_1-C_5)$alkylene.

13. The method of claim 10, wherein the compound comprising at least one silylating group and at least one ammonium group has the structure:

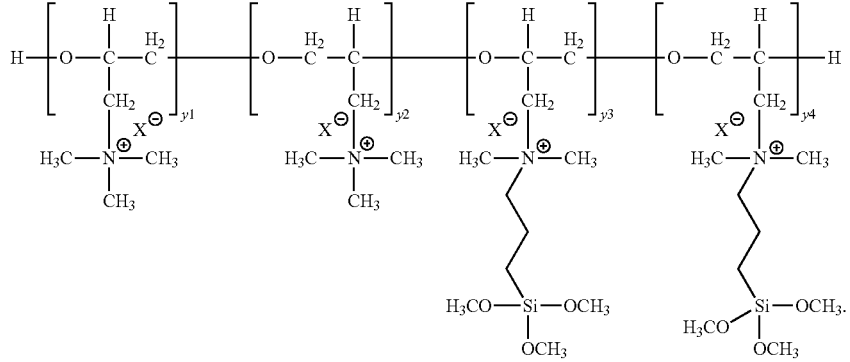

14. The method of claim 1, wherein the compound comprising at least one silylating group and at least one ammonium group has the structure:

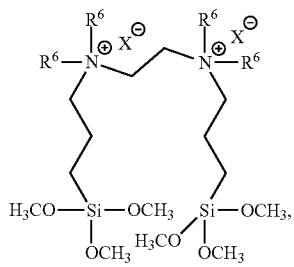

wherein at each occurrence, $R^6$ is independently selected from the group consisting of —H, substituted or unsubstituted ($C_1$-$C_{10}$)alkyl, and substituted or unsubstituted ($C_6$-$C_{20}$)aryl.

15. The method of claim 1, wherein the placing of the composition in the subterranean formation comprises fracturing at least part of the subterranean formation to form at least one subterranean fracture.

16. A system for performing the method of claim 1, the system comprising:
a tubular disposed in the subterranean formation;
a pump configured to pump the composition in the subterranean formation through the tubular.

17. The method of claim 1, wherein the composition further comprises a proppant.

18. A method of treating a subterranean formation, comprising:
placing a composition comprising a compound into the subterranean formation, the compound comprising at least one silylating group and at least one ammonium group, the silylating group comprises a hydroxyl-reactive organosilicone group, the ammonium group comprises an ion-exchange clay-stablizing group, and the compound comprising the structure:

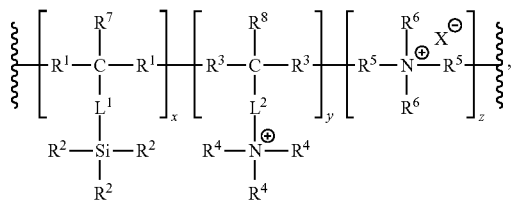

wherein:
at each occurrence, each group having degree of polymerization x, y, and z is independently in a block or random arrangement and is independently oriented as shown or in the opposite orientation;
at each occurrence, $R^1$, $R^3$, and $R^5$ are each independently selected from the group consisting of a bond, —O—, —$NR^7$—, —$N^-(R^7)_2X^-$—, —S—, and a substituted or unsubstituted ($C_1$-$C_{20}$)hydrocarbylene at least one of interrupted and terminated with 0, 1, 2, or 3 groups independently selected from —O—, —$NR^7$—, —$N^+(R^7)_2X^-$—, and —S—;
at each occurrence, $R^2$ is independently selected from the group consisting of —OH, substituted or unsubstituted ($C_1$-$C_{20}$)hydrocarbyl, substituted or unsubstituted ($C_1$-$C_{20}$)hydrocarbyloxy, -$L^2$-$SiR^2_3$, -$L^2$-$N^+R^4_3X^-$, and an inter- or intra-molecular crosslink to an Si atom;
at each occurrence, $R^4$ and $R^6$ are each independently selected from the group consisting of —H, substituted or unsubstituted ($C_1$-$C_{20}$)hydrocarbyl, -$L^1$-$SiR^2_3$, and -$L^2$-$N^+R^4_3X^-$;
at each occurrence, $R^7$ and $R^8$ are each independently selected from the group consisting of —H, —OH, substituted or unsubstituted ($C_1$-$C_{20}$)hydrocarbyl, substituted or unsubstituted ($C_1$-$C_{20}$)hydrocarbyloxy, -$L^1$-$SiR^2_3$, and -$L^2$-$N^+R^4_3X^-$;
at each occurrence, $L^1$ and $L^2$ are each independently selected from the group consisting of a bond, a poly(substituted or unsubstituted ($C_1$-$C_{20}$)hydrocarbyloxy), a poly(substituted or unsubstituted ($C_1$-$C_{20}$) hydrocarbylamino), and a substituted or unsubstituted ($C_1$-$C_{20}$)hydrocarbyl at least one of interrupted and terminated with 0, 1, 2, or 3 groups independently selected from —O—, —$NR^7$—, —$N^+(R^7)_2X^{31}$—, and —S—, wherein each amino group is independently substituted or unsubstituted and is independently neutral or ammonium;
$X^-$ is a counterion; and
x+y+z is greater than 0.

19. The method of claim 18, wherein the composition further comprises a proppant, and the method further comprises hydraulically fracturing the subterranean formation to generate flow pathway in the subterranean formation.

20. A composition for treatment of a subterranean formation, comprising:
a compound comprising at least one silylating group and at least one ammonium group, wherein:
the silylating group comprises a hydroxyl-reactive organosilicone group; and
the ammonium group comprises an ion-exchange clay-stabilizing group; and
a fracturing fluid.

* * * * *